United States Patent
Yamamoto

(10) Patent No.: US 12,257,638 B2
(45) Date of Patent: Mar. 25, 2025

(54) CUTTING INSERT, CUTTING TOOL AND METHOD FOR MANUFACTURING MACHINED PRODUCT

(71) Applicant: KYOCERA CORPORATION, Kyoto (JP)

(72) Inventor: Masahiro Yamamoto, Ritto (JP)

(73) Assignee: KYOCERA CORPORATION, Kyoto (JP)

( * ) Notice: Subject to any disclaimer, the term of this patent is extended or adjusted under 35 U.S.C. 154(b) by 292 days.

(21) Appl. No.: 17/287,993

(22) PCT Filed: Oct. 18, 2019

(86) PCT No.: PCT/JP2019/041148
§ 371 (c)(1),
(2) Date: Apr. 22, 2021

(87) PCT Pub. No.: WO2020/085245
PCT Pub. Date: Apr. 30, 2020

(65) Prior Publication Data
US 2021/0379678 A1    Dec. 9, 2021

(30) Foreign Application Priority Data
Oct. 23, 2018  (JP) ................................. 2018-199365

(51) Int. Cl.
*B23C 5/20* (2006.01)
*B23C 5/06* (2006.01)

(52) U.S. Cl.
CPC .............. *B23C 5/202* (2013.01); *B23C 5/06* (2013.01); *B23C 2200/0494* (2013.01); *B23C 2200/284* (2022.02); *B23C 2200/367* (2013.01)

(58) Field of Classification Search
CPC ............ Y10T 407/23; B23C 2210/082; B23C 2200/367; B23C 2200/121;
(Continued)

(56) References Cited

U.S. PATENT DOCUMENTS 5,639,189 A * 6/1997 Hoefler ..................... B23C 3/04
407/42
5,853,267 A * 12/1998 Satran ..................... B23C 5/202
407/116
(Continued)

FOREIGN PATENT DOCUMENTS

CN        106735353 A  *  5/2017  .......... B23B 27/005
DE          9307640 U1 *  9/1993
(Continued)

*Primary Examiner* — Ryan Rufo
(74) *Attorney, Agent, or Firm* — HAUPTMAN HAM, LLP

(57) ABSTRACT

A cutting insert may include a first surface, a second surface and a lateral surface. The first surface may have a polygonal shape and may include a first corner, a second corner, a third corner, a first side and a second side. The lateral surface may include a first lateral surface and a second lateral surface. At least a part of the first lateral surface may be located between the first side and the second surface. At least a part of the second lateral surface may be located between the second side and the second surface. The first lateral surface may be located further outside than the first side in a front view of the first surface. The first lateral surface may include a first region located closer to the second lateral surface as coming closer to the second surface.

20 Claims, 17 Drawing Sheets

(58) Field of Classification Search
CPC .......... B23C 2200/12; B23C 2200/125; B23C
2200/126; B23C 2200/0438; B23C
2200/0494; B23C 2200/085; B23C
2200/283; B23C 2200/284; B23C
2200/28; B23C 2200/291; B23C
2200/203; B23C 2200/205; B23C
2200/369; B23C 5/202; B23C 5/20; B23C
5/2204; B23C 5/2208; B23C 5/2213;
B23C 220/367; B23C 220/284; B23C
220/121; B23C 220/125; B23C 220/126;
B23C 220/0494; B23C 5/2247; B23C
5/2273; B23C 2200/293; B23B 2200/369;
B23B 2200/28; B23B 2200/0452; B23B
2200/0476; B23B 2200/125
See application file for complete search history.

(56) References Cited

U.S. PATENT DOCUMENTS

| | | | | |
|---|---|---|---|---|
| 7,232,279 B2 * | 6/2007 | Smilovici | ............ | B23C 5/2213 407/115 |
| 7,241,082 B2 * | 7/2007 | Smilovici | ............ | B23C 5/2213 407/115 |
| 7,357,603 B2 * | 4/2008 | Hoefler | ................... | B23C 5/205 407/115 |
| 7,500,810 B2 * | 3/2009 | Maeta | .................... | B23C 5/202 407/115 |
| 8,449,230 B2 * | 5/2013 | Nguyen | ................. | B23C 5/202 407/42 |
| 8,702,353 B2 * | 4/2014 | Chen | .................... | B23C 5/2213 407/113 |
| 9,022,700 B2 * | 5/2015 | Bhagath | .................... | B23C 5/06 407/113 |
| 9,108,254 B2 * | 8/2015 | Lee | ........................ | B23C 5/202 |
| 9,511,427 B2 * | 12/2016 | Horiike | ............... | B23B 27/1611 |
| 9,724,769 B2 * | 8/2017 | Shiota | .................... | B23C 5/202 |
| 9,731,359 B2 * | 8/2017 | Park | ........................ | B23C 5/202 |
| 9,975,188 B2 * | 5/2018 | Roman | .................... | B23C 5/06 |
| 10,046,398 B2 * | 8/2018 | Agic | ..................... | B23B 27/1662 |
| 10,682,713 B2 * | 6/2020 | Jansson | ................. | B23C 5/2213 |
| 10,799,961 B2 * | 10/2020 | Kitajima | ................. | B23C 5/109 |
| 11,045,886 B2 * | 6/2021 | Hagiwara | ................. | B23C 5/06 |
| 2008/0226403 A1 * | 9/2008 | Craig | ..................... | B23C 5/202 407/113 |
| 2009/0136304 A1 * | 5/2009 | Satran | ..................... | B23C 5/202 407/104 |
| 2012/0301235 A1 * | 11/2012 | Yoshioka | .............. | B23C 5/2213 407/115 |
| 2015/0056028 A1 * | 2/2015 | Ben Amor | ........... | B23B 27/145 407/113 |
| 2017/0120351 A1 * | 5/2017 | Fang | ....................... | B23C 5/205 |
| 2017/0291231 A1 * | 10/2017 | Mao | ........................ | B23C 5/202 |
| 2017/0341160 A1 * | 11/2017 | Furucrona | ........... | B23B 27/1614 |
| 2018/0257155 A1 * | 9/2018 | Kitajima | .................. | B23C 5/10 |
| 2018/0304382 A1 * | 10/2018 | Hecht | ................... | B23C 5/2213 |
| 2019/0314906 A1 * | 10/2019 | Mihalik | ................. | B23C 5/109 |
| 2021/0252615 A1 * | 8/2021 | Kister | .................... | B23C 5/202 |

FOREIGN PATENT DOCUMENTS

| | | | | | |
|---|---|---|---|---|---|
| EP | | 3243589 A1 | * | 11/2017 | ........... B23C 5/2221 |
| EP | | 3243590 A1 | * | 11/2017 | |
| JP | | 2000516152 A | * | 12/2000 | ............... B23C 5/20 |
| JP | | 200798506 A | | 4/2007 | |
| JP | | 5938868 B2 | * | 6/2016 | |
| JP | | 2016172294 A | * | 9/2016 | ............... B23C 5/20 |
| JP | | 2011504817 A | * | 2/2017 | ............... B23C 5/20 |
| JP | | 201756552 A | | 3/2017 | |
| JP | | 2017056552 A | * | 3/2017 | ............... B23C 5/10 |
| KR | | 2013029199 A | * | 3/2013 | ............ B23C 5/109 |
| KR | | 1020130029199 A | | 3/2013 | |
| WO | WO-2012099153 A1 | | * | 7/2012 | ........... B23C 5/2213 |
| WO | WO-2015002312 A1 | | * | 1/2015 | ............ B23C 5/109 |
| WO | WO-2016047795 A1 | | * | 3/2016 | ............ B23C 5/109 |
| WO | WO-2016147493 A1 | | * | 9/2016 | ............... B23C 5/20 |

* cited by examiner

CUTTING INSERT, CUTTING TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/041148 filed on Oct. 18, 2019, which claims priority to Japanese Application No. 2018-199365 filed on Oct. 23, 2018, which are entirely incorporated herein by reference.

TECHNICAL FIELD

The present disclosure may generally relate to a cutting insert (hereinafter also referred to simply as an insert) for use in a cutting process of a workpiece, a cutting tool and a method for manufacturing a machined product. Specifically, the present disclosure may relate to a cutting tool for use in a milling process.

BACKGROUND

For example, an indexable insert may be discussed in Japanese Unexamined Patent Publication No. 2007-98506 (Patent Document 1) and may be used as an insert for use in a cutting process of a workpiece, such as metal. The insert discussed in Patent Document 1 may have a quadrangular plate shape. A main cutting edge may be located on a ridgeline where an upper surface intersects with one of lateral surfaces (a first lateral surface), and a sub cutting edge may be located on a ridgeline where lateral surfaces adjacent to each other (the first lateral surface and a second lateral surface) intersect with each other. A flat surface may be formed on each of the upper surface and the second lateral surface.

If these flat surfaces are wide, the insert may be stably fixable to a holder. However, if these flat surfaces are wide, these flat surfaces may interfere with the workpiece. Particularly, these flat surfaces may interfere with the workpiece at a portion close to a corner where the main cutting edge intersects with the sub cutting edge.

SUMMARY

An insert in a non-limiting aspect of the present disclosure may include a first surface, a second surface and a lateral surface. The first surface may have a polygonal shape. The second surface may be located on a side opposite to the first surface. The lateral surface may be located between the first surface and the second surface. The first surface may include a first corner, a second corner, a third corner, a first side and a second side. Each of the second corner and the third corner may be located adjacent to the first corner. The first side may be located between the first corner and the second corner. The second side may be located between the first corner and the third corner. The lateral surface may include a first lateral surface and a second lateral surface. At least a part of the first lateral surface may be located between the first side and the second surface. At least a part of the second lateral surface may be located between the second side and the second surface. The first lateral surface may be located further outside than the first side in a front view of the first surface. The first lateral surface may include a first region located closer to the second lateral surface as coming closer to the second surface.

EMBODIMENTS

Figure 1:
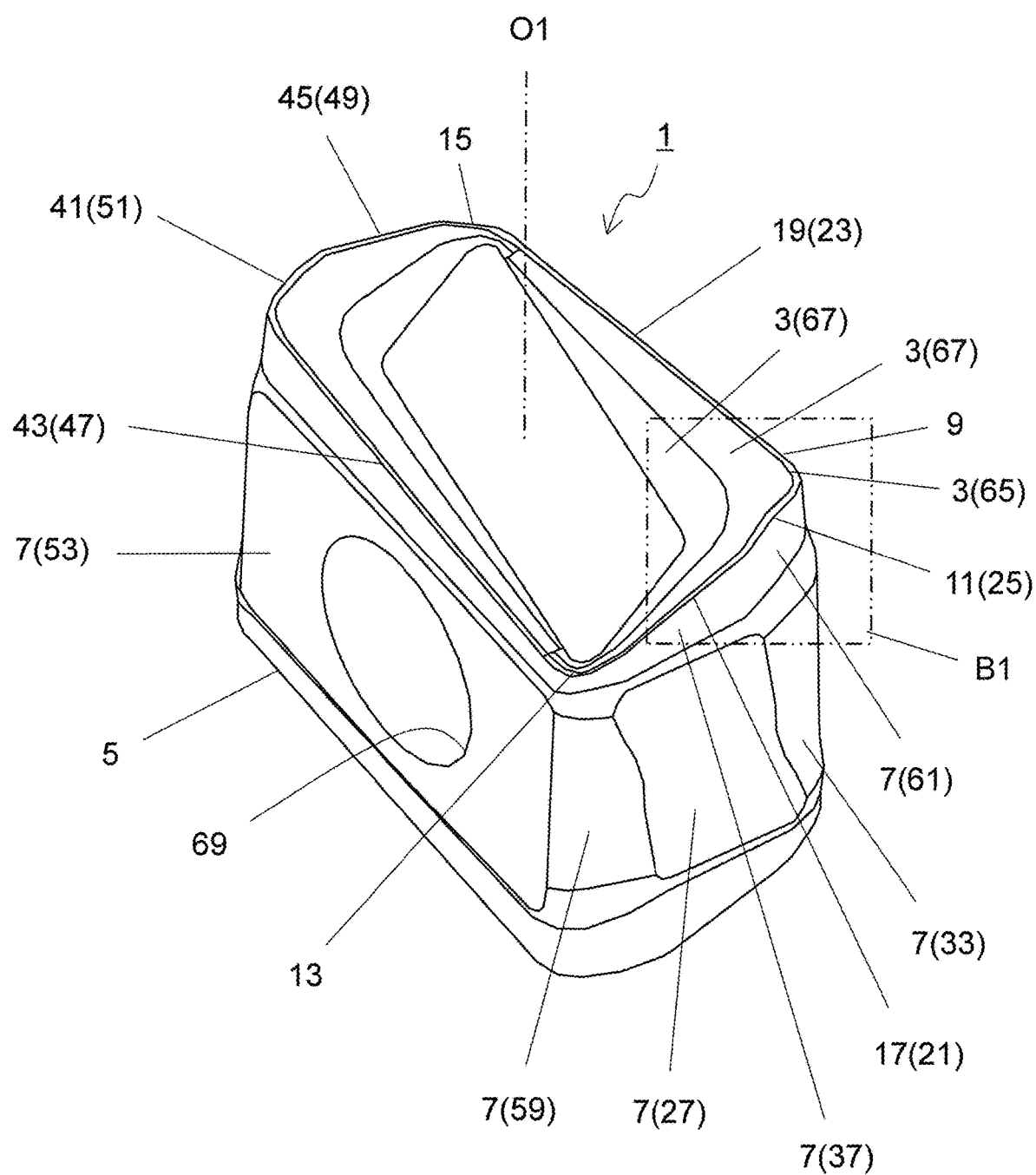
FIG. 1 is a perspective view illustrating an insert of a non-limiting aspect of the present disclosure.

Cutting inserts 1 (inserts 1) in non-limiting embodiments may be described in detail below with reference to the drawings. For the sake of description, the drawings referred to in the following may illustrate, in simplified form, only main members necessary for describing the non-limiting embodiments. The following inserts 1 may therefore be capable of including any arbitrary structural member not illustrated in the drawings referred to. Dimensions of the members in each of the drawings faithfully may represent neither dimensions of actual structural members nor dimensional ratios of these members.

<Inserts>

The insert 1 may include, for example, a first surface 3, a second surface 5, a lateral surface 7 and a cutting edge 9 as illustrated in FIG. 1. The first surface 3 may have a polygonal shape including a plurality of corners and a plurality of sides as in a non-limiting embodiment illustrated in FIG. 2. The first surface 3 may have an approximately rectangular shape as in the non-limiting embodiment illustrated in FIG. 2.

The second surface 5 may be located on a side opposite to the first surface 3, and may have a polygonal shape including a plurality of corners and a plurality of sides similarly to the first surface 3. Similarly to the first surface 3, the second surface 5 may have an approximately rectangular shape. The insert 1 may have a quadrangular prism shape as illustrated in FIG. 1.

As used herein, the term "polygonal shape" may not denote a strict polygonal shape. For example, the four sides of the first surface 3 may not be individually a strict straight line, but may be slightly curved in a front view of the first surface 3. The four corners of the first surface 3 may not be individually a strict corner.

Figure 2:
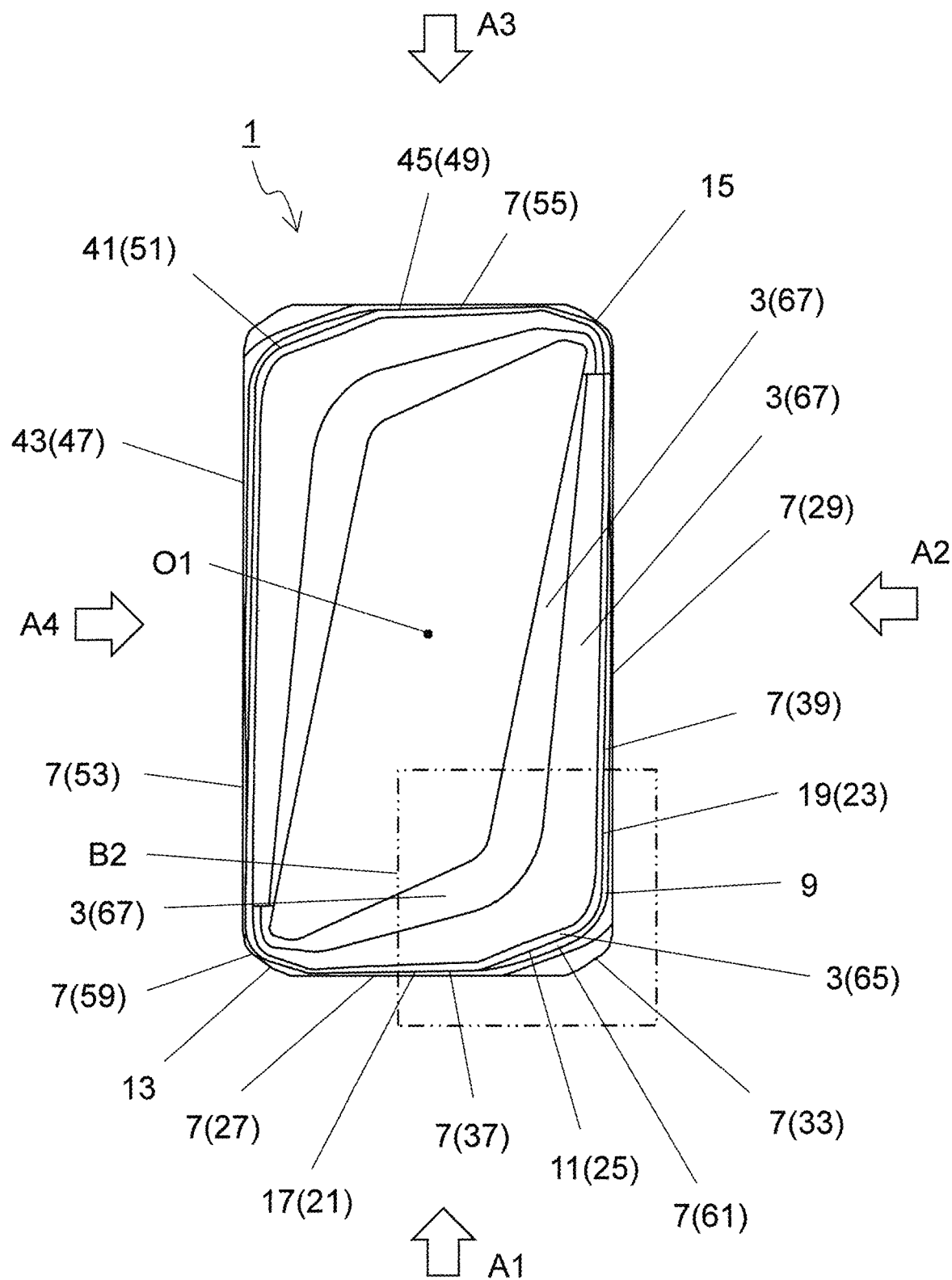
FIG. 2 is a front view of the insert illustrated in FIG. 1 as viewed from a side of a first surface.
Figure 3:
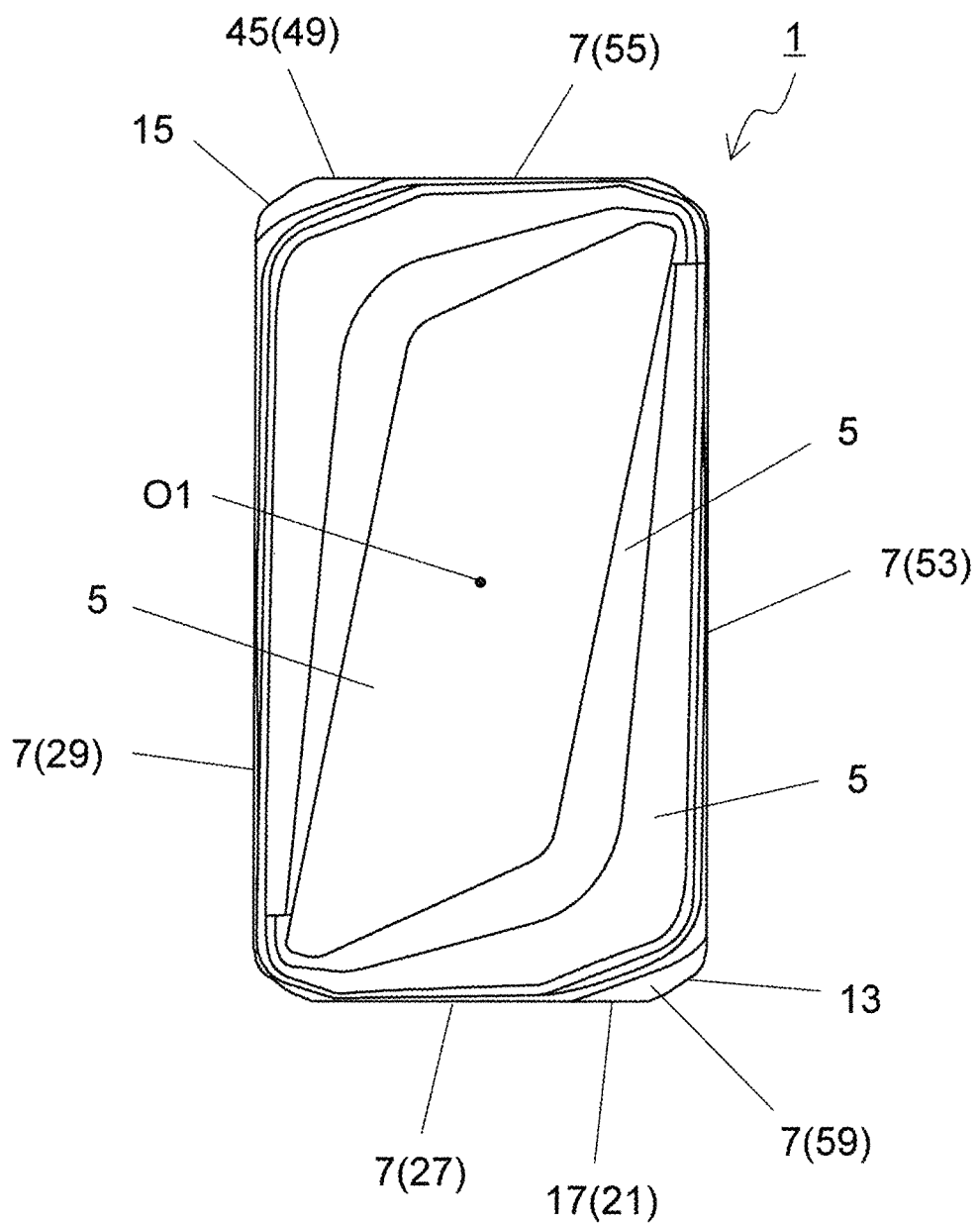
FIG. 3 is a front view of the insert illustrated in FIG. 1 as viewed from a side of a second surface.

The first surface 3 may have a rectangular shape and may include the four corners and the four sides as in the non-limiting embodiment illustrated in FIG. 2. The four corners may include a first corner 11, a second corner 13 and a third corner 15. The four sides may include a first side 17 and a second side 19. That is, the first surface 3 may include the first corner 11, the second corner 13, the third corner 15, the first side 17 and the second side 19.

The second corner 13 and the third corner 15 may be individually located adjacent to the first corner 11. The first side 17 may be located between the first corner 11 and the second corner 13. In other words, the first side 17 may be extended from the first corner 11 toward the second corner 13.

The second side 19 may be located between the first corner 11 and the third corner 15. In other words, the second side 19 may be extended from the first corner 11 toward the third corner 15. These parts may be located on an outer peripheral edge of the first surface 3 in the order of the second corner 13, the first side 17, the first corner 11, the second side 19 and the third corner 15 in a direction from the second corner 13 toward the third corner 15.

The first corner 11 is not limited to a strict corner formed by the intersection of the first side 17 with the second side 19. For example, the first corner 11 may have a convex curvilinear shape that protrudes outward in the front view of the first surface 3. Alternatively, the first corner 11 may have a configuration obtained by combining a straight line and a curved line as in the non-limiting embodiment illustrated in FIG. 2. Similarly to the first corner 11, the second corner 13 and the third corner 15 are not limited to a strict corner.

One of short sides of the first surface 3 having the rectangular shape may correspond to the first side 17 in the non-limiting embodiment illustrated in FIG. 2. One of long sides of the first surface 3 having the rectangular shape may correspond to the second side 19 in the non-limiting embodiment illustrated in FIG. 2. Because the first surface 3 has the rectangular shape in the non-limiting embodiment illustrated in FIG. 2, an angle at which an extension line of the first side 17 intersects with an extension line of the second side 19 may be approximately 90° in the front view of the first surface 3.

An imaginary straight line passing through a center of the first surface 3 and a center of the second surface 5 may be a central axis O1. An imaginary plane that is located between the first surface 3 and the second surface 5 and is orthogonal to the central axis O1 may be a reference plane S1. Because the first surface 3 has the rectangular shape in the non-limiting embodiment illustrated in FIG. 2, an intersection of diagonals of the first surface 3 may be regarded as the center of the first surface 3. Intersection portions of the extension lines of the individual sides constituting the rectangular shape may serve as a starting point of the diagonals.

Similarly, because the second surface 5 has the rectangular shape in the non-limiting embodiment illustrated in FIG. 2, an intersection of diagonals of the second surface 5 may be regarded as the center of the second surface 5. If the first surface 3 does not have the rectangular shape, the center of the first surface 3 may be determined, for example, by a position of a center of gravity of the first surface 3 in the front view of the first surface 3.

The first surface 3 may have rotational symmetry of 180° around the central axis O1 in the front view of the first surface 3. The second surface 5 may have rotational symmetry of 180° around the central axis O1 in the front view of the second surface 5.

The shapes of the first surface 3 and the second surface 5 are not limited to the above shape. The first surface 3 may have an approximately quadrangular shape in a non-limiting embodiment illustrated in FIG. 1. Alternatively, the first surface 3 and the second surface 5 may have, for example, a triangular shape, pentagonal shape, hexagonal shape or octagonal shape.

The lateral surface 7 may be located between the first surface 3 and the second surface 5. The lateral surface 7 may connect to the first surface 3 and the second surface 5 as in a non-limiting embodiment illustrated in FIGS. 4 and 5. The insert 1 may include a cutting edge 9 located on at least a part of an intersection of the first surface 3 and the lateral surface 7.

The cutting edge 9 may be usable to cut out a workpiece if the insert 1 is used to manufacture a machined product. The cutting edge 9 may be located over the whole or a part of the intersection. The insert 1 may further include another cutting edge located on at least a part of an intersection of the second surface 5 and the lateral surface 7.

If the cutting edge 9 is located on at least the part of the insertion of the first surface 3 and the lateral surface 7, one of the first surface 3 and the lateral surface 7 may include a rake surface region, and the other may include a flank surface region. The first surface 3 may include the rake surface region and the lateral surface 7 may include the flank surface region as in the non-limiting embodiment illustrated in FIG. 1.

The cutting edge 9 may include a first cutting edge 21, a second cutting edge 23 and a first corner cutting edge 25 as illustrated in FIG. 1. The cutting edge 9 may be usable in a cutting process of a workpiece. The first cutting edge 21 may be located on the first side 17. For example, if the insert 1 is used to carry out the cutting process of the workpiece, the first cutting edge 21 may be used as a bottom cutting edge located along a machined surface of the workpiece.

The second cutting edge 23 may be located on the second side 19. The second cutting edge 23 may be used as an outer peripheral cutting edge. If the first cutting edge 21 is used as the bottom cutting edge, and the second cutting edge is used as the outer peripheral cutting edge, the second cutting edge 23 may contribute mainly to the cutting process. The second cutting edge 23 may therefore be called a main cutting edge 9 in some cases.

The first corner cutting edge 25 may be located at the first corner 11. The first corner cutting edge 25 may located over the whole or a part of the first corner 11. The first corner cutting edge 25 may be located over the whole of the first corner 11 in the embodiment illustrated in FIG. 1.

A maximum width of the first surface 3 may be, for example, 6-25 mm in the front view of the first surface 3. A height from the first surface 3 to the second surface 5 may be, for example, 5-20 mm. As used herein, the term "height from the first surface 3 to the second surface 5" may denote a maximum value of a distance between the first surface 3 and the second surface 5 in a direction parallel to the central axis O1, and may be rephrased as a width of the lateral surface 7 in a direction along the central axis O1.

Figure 4:
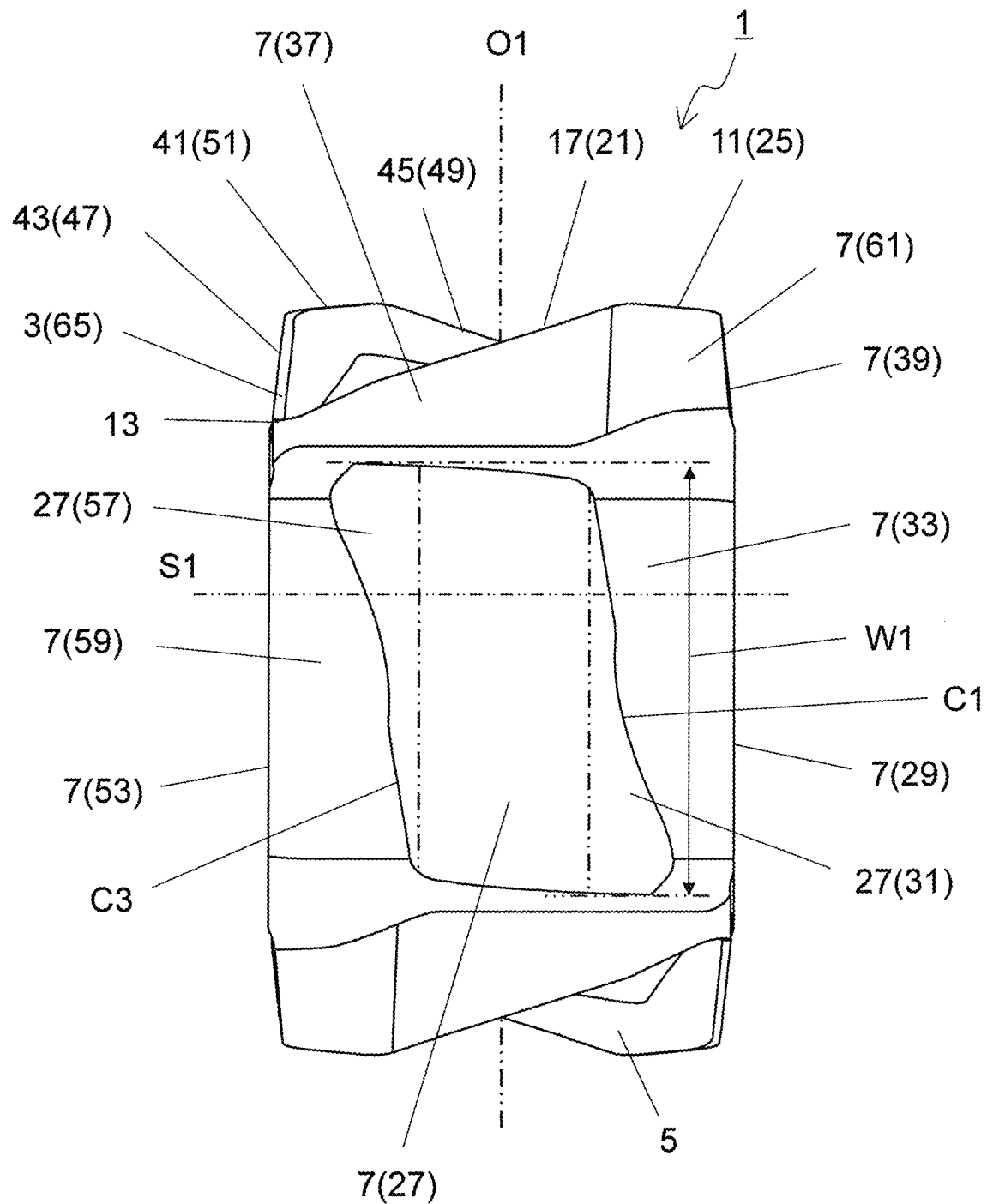
FIG. 4 is a side view of the insert illustrated in FIG. 2 as viewed from A1 direction.
Figure 5:
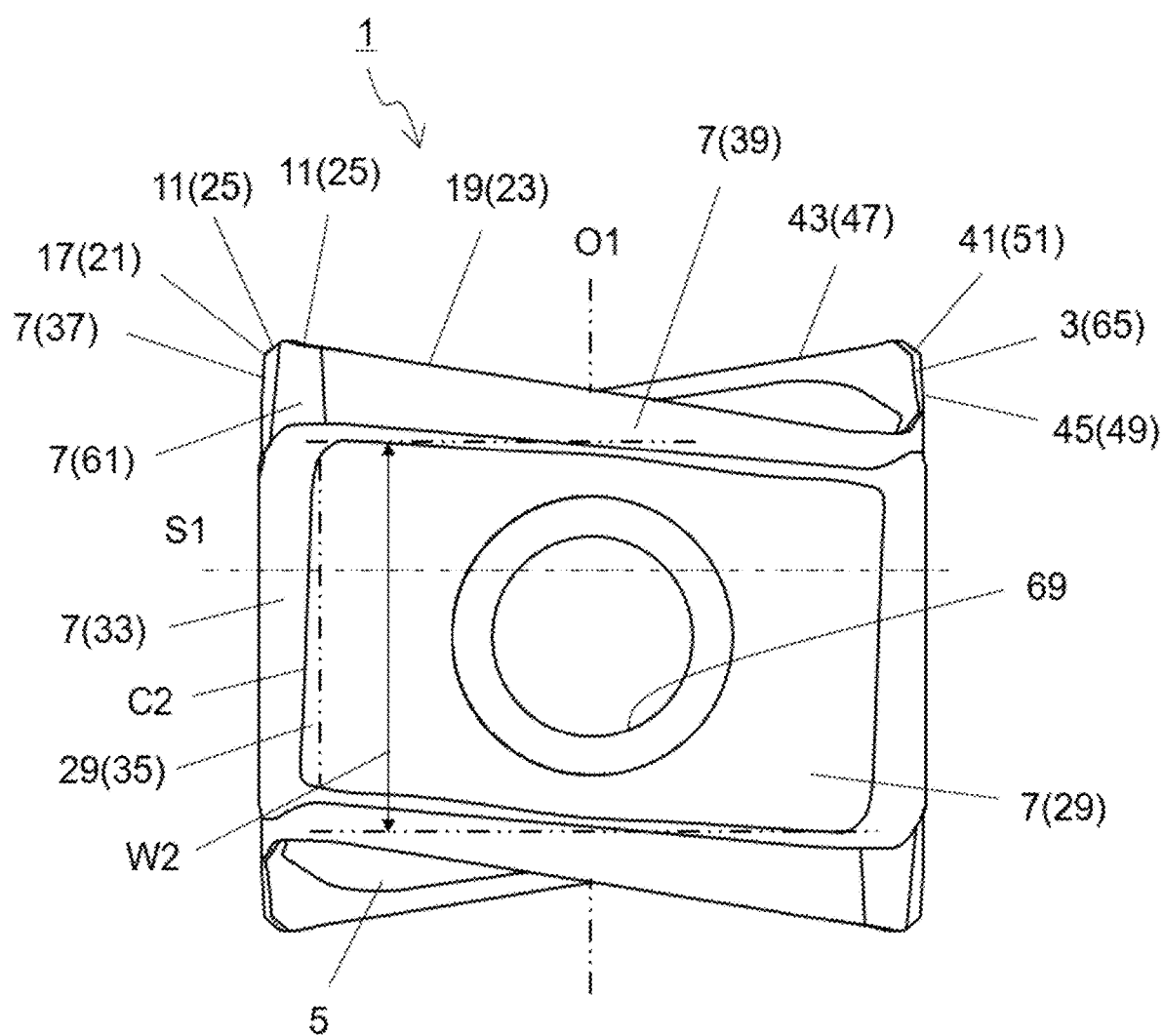
FIG. 5 is a side view of the insert illustrated in FIG. 2 as viewed from A2 direction.

The lateral surface 7 may include a first lateral surface 27 and a second lateral surface 29 in the present embodiment as illustrated in FIGS. 4 and 5. At least a part of the first lateral surface 27 may be located between the first side 17 and the second surface 5. The first lateral surface 27 may have a planer shape. At least a part of the second lateral surface 29 may be located between the second side 19 and the second surface 5. The second lateral surface 29 may have a planar shape.

The first lateral surface 27 and the second lateral surface 29 may be used as a surface brought into contact with a holder 103 if fixing the insert 1 to the holder. If the first lateral surface 27 and the second lateral surface 29 are flat, the insert 1 may be stably fixable to the holder.

The above flat surface region is not limited to a strict flat surface. These surface regions may be approximately flat, and specifically may be slightly curved or may have slight irregularities, both of which are unremarkable on the whole. More specifically, these surface regions may include slight irregularities of approximately several tens of μm.

The first lateral surface 27 may be inclined instead of being parallel to the second lateral surface 29. The first lateral surface 27 may be inclined at an angle of approximately 90° with respect to the second lateral surface 29 in the non-limiting embodiment illustrated in FIG. 2 because the extension line of the first side 17 intersects with the extension line of the second side 19 at an angle of approximately 90° in the front view of the first surface 3.

The first lateral surface 27 may be located further outside than the first side 17 in the front view of the first surface 3. In other words, the first lateral surface 27 may be located further away from the center of the first surface 3 than the first side 17 in the front view of the first surface 3. If the first lateral surface 27 is located further outside than the first side 17, the cutting edge 9 may be less likely to come into contact with the holder if the first lateral surface 27 is brought into contact with the holder in order to fix the insert 1 to the holder. The holder and the cutting edge 9 may therefore be less susceptible to damage.

The first lateral surface 27 may include a region located closer to the second lateral surface 29 as coming closer to the second surface 5. Hereinafter, this region may be referred to as a first region 31. The first region 31 may be located so as to include an end portion of the first lateral surface 27 which is located on a side of the second lateral surface 29 as illustrated in FIG. 4. The first region 31 may also be located so as to include an end portion of the first lateral surface 27 which is located on a side of the second surface 5.

At least a part of an outer peripheral edge of the first lateral surface 27 which is located on a side of the second lateral surface 29 may be included in the first region 31. In other words, the part of the outer peripheral edge of the first lateral surface 27 which is included in the first region 31 may be located closer to the second lateral surface 29 as coming closer to the second surface 5.

As in the non-limiting embodiment illustrated in FIG. 2, a first curved surface 33 having a convex curved surface shape may be located between the first lateral surface 27 and the second lateral surface 29. The first curved surface 33 may be located between the first corner 11 and the second surface 5 as in the non-limiting embodiment illustrated in FIG. 5. A boundary part C1 between the first lateral surface 27 and the first curved surface 33 may be located closer to the second lateral surface 29 as coming closer to the second surface 5 as in the non-limiting embodiment illustrated in FIG. 4. Specifically, the boundary part C1 may extended obliquely in a direction from upper left to lower right as in the non-limiting embodiment illustrated in FIG. 4.

The part of the outer peripheral edge of the first lateral surface 27 which is included in the first region 31 may be located closer to the second lateral surface 29 as coming closer to the second surface 5. In other words, the part of the outer peripheral edge of the first lateral surface 27 which is included in the first region 31 may be located away from the second lateral surface 29 as coming closer to the first surface 3. In this case, the first lateral surface 27 may be less likely to interfere with the workpiece if the first corner cutting edge 25 is used to carry out the cutting process of the workpiece. This may facilitate to obtain a smooth finish of a machined surface of the workpiece.

The first lateral surface 27 may be less likely to interfere with the workpiece and may be less susceptible to wear. Consequently, the insert 1 may be stably fixable to the holder if the first lateral surface 27 is brought into contact with the holder in order to fix the insert 1 to the holder.

As stated earlier, one of the short sides of the first surface 3 may be the first side 17, and one of the long sides of the first surface 3 may be the second side 19. Thus, the first side 17 may be shorter than the second side 19.

If the first side 17 is shorter than the second side 19, the first lateral surface 27 may tend to have a smaller area than the second lateral surface 29. In cases where the first lateral surface 27 includes the first region 31, the insert 1 may be stably fixable to the holder even if the area of the first lateral surface 27 is relatively small.

The whole of the first region 31 may be located between the first side 17 and the second surface 5 in a front view of the first lateral surface 27. Alternatively, at least a part of the first region 31 may be located between the first corner 11 and the second surface 5. If at least the part of the first region 31 is located between the first corner 11 and the second surface 5 as described above, the first lateral surface 27 may be less likely to interfere with the workpiece during the cutting process, and the insert 1 may be stably fixable to the holder.

Figure 10:
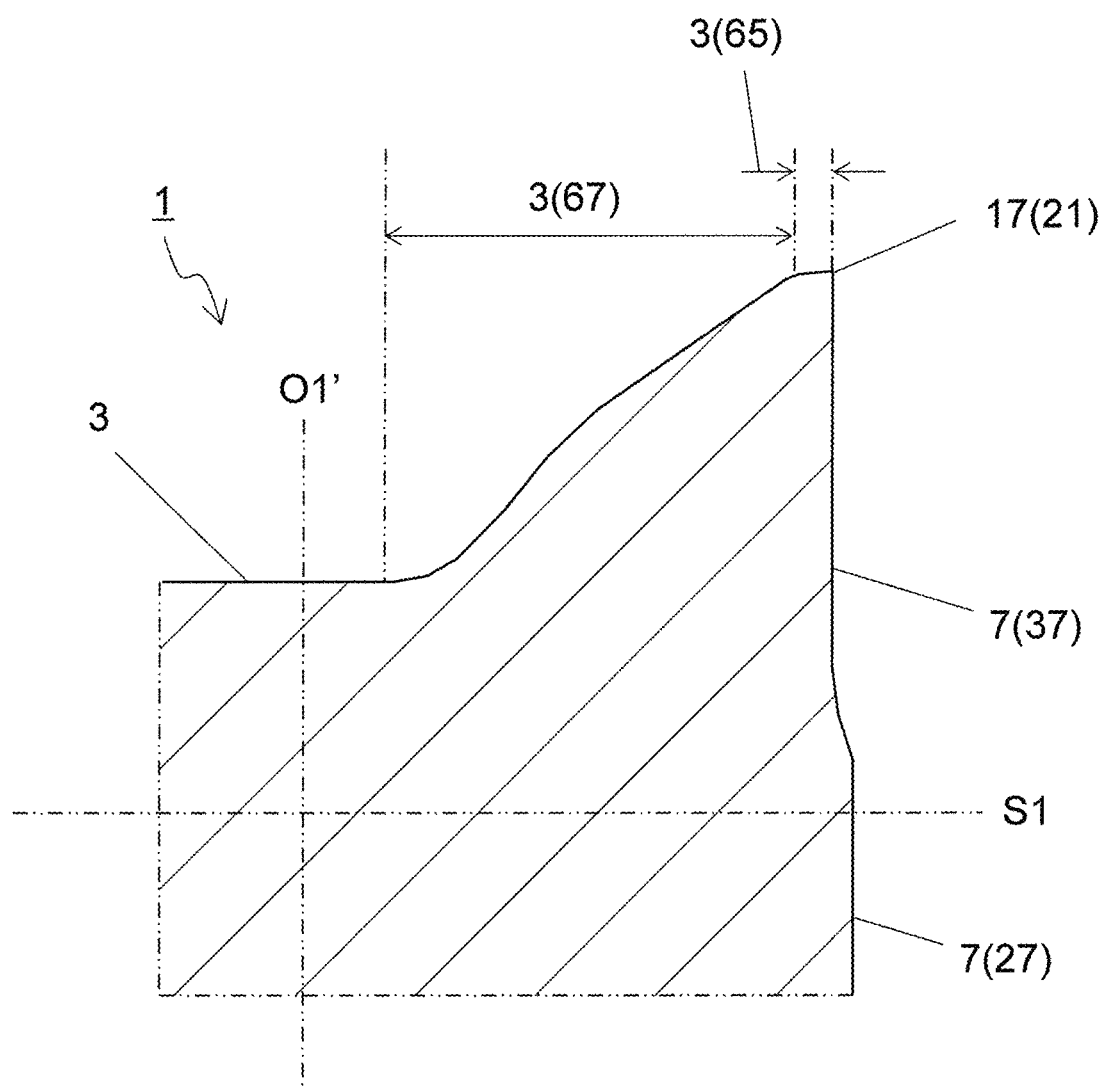
FIG. 10 is a sectional view taken along line X-X in the insert illustrated in FIG. 9.

The first lateral surface 27 may be inclined or parallel to the central axis O1 in a cross section that includes the central axis O1 and intersects with the first lateral surface 27. FIG. 10 may illustrate the cross section that includes the central axis O1 and intersects with the first lateral surface 27, and may illustrate a first imaginary straight line O1' parallel to the central axis O1. If the first lateral surface 27 is parallel to the central axis O1 (the first imaginary straight line O1') in the above cross section, the insert 1 may be less susceptible to dislocation with respect to the holder, and the insert 1 may be more stably fixable to the holder.

The second lateral surface 29 may be located further outside than the second side 19 in the front view of the first surface 3. In other words, the second lateral surface 29 may be located further away from the center of the first surface 3 than the second side 19 in the front view of the first surface 3. If the second lateral surface 29 is located further outside than the second side 19, the cutting edge 9 may be less likely to come into contact with the holder if the second lateral surface 29 is brought into contact with the holder in order to fix the insert 1 to the holder. Consequently, the holder and the cutting edge 9 may be less susceptible to damage.

The second lateral surface 29 may include a region located closer to the first lateral surface 27 as coming closer to the second surface 5. Hereinafter, this region may be referred to as a second region 35. The second region 35 may be located so as to include an end portion of the second lateral surface 29 which is located on a side of the first lateral surface 27 as illustrated in FIG. 5.

At least a part of an outer peripheral edge of the second lateral surface 29 which is located on a side of the first lateral surface 27 may be included in the second region 35. The part of the outer peripheral edge of the second lateral surface 29 which is included in the second region 35 may be located closer to the first lateral surface 27 as coming closer to the second surface 5.

As in the non-limiting embodiment illustrated in FIG. 1, the first curved surface 33 having the convex curved surface shape may be located between the first lateral surface 27 and the second lateral surface 29. A boundary part C2 between the second lateral surface 29 and the first curved surface 33 may be located closer to the first lateral surface 27 as coming closer to the second surface 5 as in the non-limiting embodiment illustrated in FIG. 5. Specifically, the boundary part C2 may extended obliquely in a direction from upper right to lower left as in the non-limiting embodiment illustrated in FIG. 5.

The part of the outer peripheral edge of the second lateral surface 29 which is included in the second region 35 may be located closer to the first lateral surface 27 as coming closer to the second surface 5. In other words, the part of the outer peripheral edge of the second lateral surface 29 which is included in the second region 35 may be located away from the first lateral surface 27 as coming closer to the first surface 3. In this case, the second lateral surface 29 may be less likely to interfere with the workpiece if the first corner cutting edge 25 is used to carry out the cutting process of the workpiece. This may facilitate to obtain a smooth finish of a machined surface of the workpiece.

Additionally, the second lateral surface 29 may be less likely to interfere with the workpiece and may be less susceptible to wear. Consequently, the insert 1 may be stably fixable to the holder if the second lateral surface 29 is brought into contact with the holder in order to fix the insert 1 to the holder.

The whole of the second region 35 may be located between the second side 19 and the second surface 5 in a front view of the second lateral surface 29. Alternatively, at least a part of the second region 35 may be located between the first corner 11 and the second surface 5. If at least the part of the second region 35 is located between the first corner 11 and the second surface 5 as described above, the second lateral surface 29 may be less likely to interfere with the workpiece during the cutting process, and the insert 1 may be more stably fixable to the holder.

Figure 11:
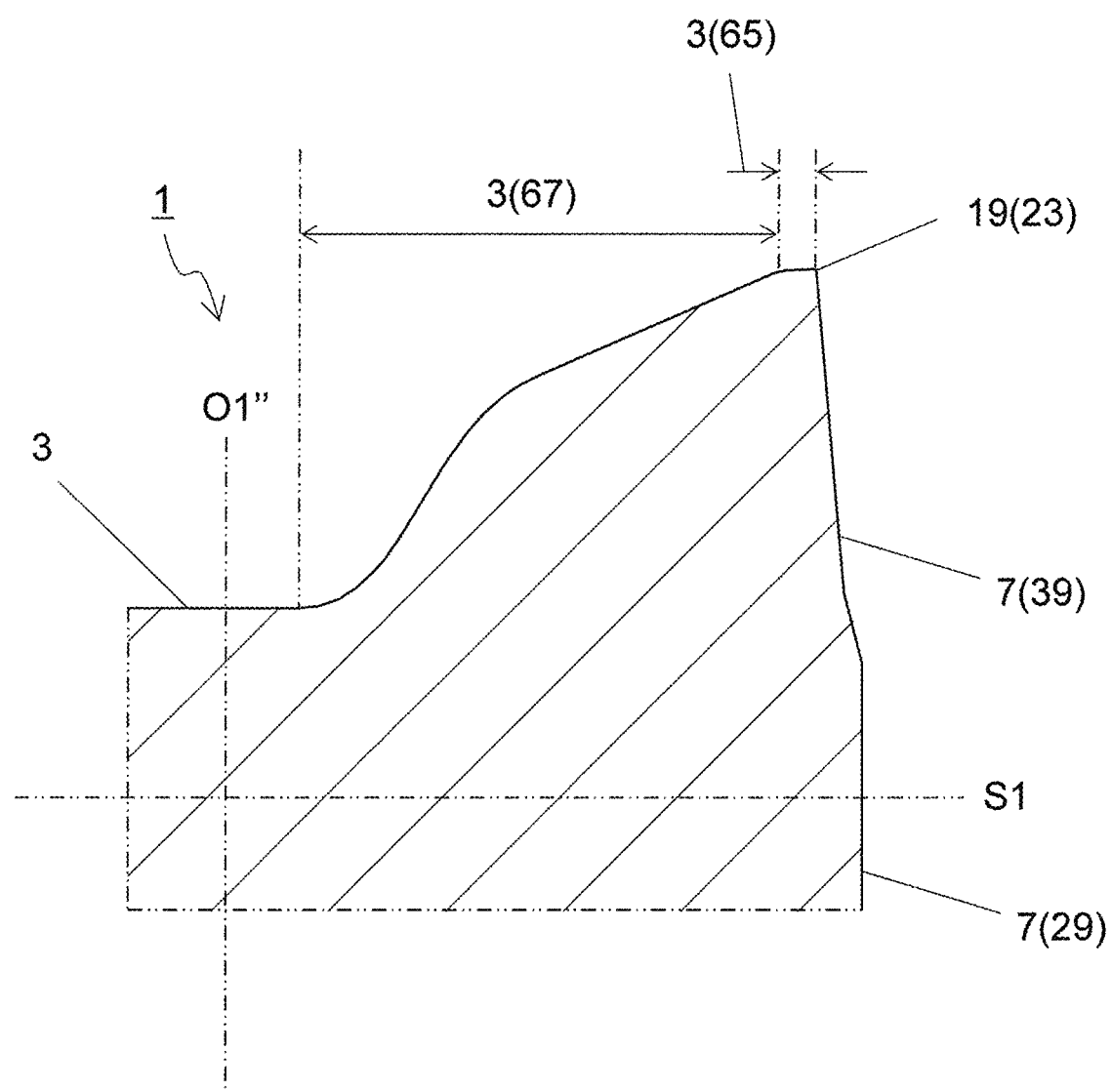
FIG. 11 is a sectional view taken along line XI-XI in the insert illustrated in FIG. 9.

The second lateral surface 29 may be inclined or parallel to the central axis O1 in a cross section that includes the central axis O1 and intersects with the second lateral surface 29. FIG. 11 may illustrate the cross section that includes the central axis O1 and intersects with the second lateral surface 29, and may illustrate a second imaginary straight line O1" parallel to the central axis O1. If the second lateral surface 29 is parallel to the central axis O1 (the second imaginary straight line O1") in the above cross section, the insert 1 may be less susceptible to dislocation with respect to the holder, and the insert 1 may be more stably fixable to the holder.

In cases where the lateral surface 7 includes the first lateral surface 27 and the second lateral surface 29, a width of the first lateral surface 27 in a direction parallel to the central axis O1 may be a first width W1, and a width of the second lateral surface 29 in the direction parallel to the central axis O1 may be a second width W2. For example, the second width W2 may be larger than the first width W1.

If the first cutting edge 21 is used as a bottom cutting edge and the second cutting edge 23 is used as an outer peripheral cutting edge in the cutting process, the second cutting edge 23 may be susceptible to relatively large cutting load. If the second width W2 is larger than the first width W1, the second cutting edge 23 may have enhanced strength. This may lead to enhanced durability of the insert 1.

The lateral surface 7 may further include a first connection surface 37 and a second connection surface 39. The first connection surface 37 may be located in a region in the lateral surface 7 which is located along the first side 17, and may connect to the first side 17 as illustrated in FIG. 4. The first connection surface 37 may be located between the first side 17 and the first lateral surface 27 in the non-limiting embodiment illustrated in FIG. 4.

The second connection surface 39 may be located in a region in the lateral surface 7 which is located along the second side 19, and may connect to the second side 19 as illustrated in FIG. 5. The second connection surface 39 may be located between the second side 19 and the second lateral surface 29 in the non-limiting embodiment illustrated in FIG. 5.

The first connection surface 37 may be inclined or parallel to the central axis O1 in the cross section including the central axis O1. The first connection surface 37 may be parallel to the first imaginary straight line O1' in FIG. 10. If the first connection surface 37 is parallel to the central axis O1 (the first imaginary straight line O1') in the above cross section, the first lateral surface 27 may be much less likely to interfere with the workpiece. Consequently, a machined surface of the workpiece may tend to have a smoother finish.

If the first connection surface 37 is parallel to the central axis O1, the first cutting edge 21 may have a sharp blade tip. Hence, in the case of using the first cutting edge 21 as a bottom cutting edge, the machined surface of the workpiece particularly may tend to have a smoother finish.

A width of the first connection surface 37 in the direction parallel to the central axis O1 may become larger as coming closer to the first corner 11 in the front view of the first lateral surface 27. If the first cutting edge 21 is used to carry out the cutting process, a part of the first lateral surface 27 which is located closer to the second lateral surface 29 may tend to come into contact with the workpiece.

If the width of the first connection surface 37 becomes larger as described above, even the part of the first lateral surface 27 which tends to come into contact with the workpiece may be less likely to interfere with the workpiece. This may lead to a smoother finish of the machined surface of the workpiece.

The second connection surface 39 may be inclined or parallel to the central axis O1 in the cross section including the central axis O1. For example, the second connection surface 39 may include a part inclined so as to be located further away from the central axis O1 (the second imaginary straight line O1") as going away from the second side 19 in the above cross section.

If the second connection surface 39 is inclined as described above, the blade tip of the second cutting edge 23 may have a large thickness and enhanced strength. The insert 1 may have enhanced durability because of the enhanced strength of the second cutting edge 23 that is susceptible to a relatively large cutting load.

The width of the second connection surface 39 in the direction parallel to the central axis O1 may become larger as coming closer to the first corner 11 in the front view of the second lateral surface 29. If the second cutting edge 23 is used to carry out the cutting process, a part of the second lateral surface 29 which is located closer to the first lateral surface 27 may be more likely to come into contact with the workpiece.

If the width of the second connection surface 39 becomes larger as described above, even the part of the second lateral surface 29 which tends to come into contact with the workpiece may be less likely to interfere with the workpiece. This may lead to a smoother finish of the machined surface of the workpiece.

The first surface 3 may further include a fourth corner 41, a third side 43 and a fourth side 45. The fourth corner 41 may be located adjacent to the second corner 13 and the third corner 15. The third side 43 may be located between the second corner 13 and the fourth corner 41. The fourth side 45 may be located between the third corner 15 and the fourth corner 41.

The other of the short sides of the first surface 3 having the rectangular shape may be the fourth side 45 in the non-limiting embodiment illustrated in FIG. 2. The other of the long sides of the first surface 3 having the rectangular shape may be the third side 43 in the non-limiting embodiment illustrated in FIG. 2. Similarly to the first corner 11, the second corner 13 and the third corner 15, the fourth corner 41 is not limited to a strict corner.

The cutting edge 9 may include a third cutting edge 47, a fourth cutting edge 49 and a second corner cutting edge 51 as illustrated in FIG. 2. The third cutting edge 47 may be located on the third side 43. The third cutting edge 47 may be usable as an outer peripheral cutting edge. The fourth cutting edge 49 may be located on the fourth side 45. For example, if the insert 1 of the present embodiment is used to carry out the cutting process of the workpiece, the fourth cutting edge 49 may be usable as a bottom cutting edge located along the machined surface of the workpiece.

In cases where the fourth cutting edge 49 is used as the bottom cutting edge and the third cutting edge 47 is used as the outer peripheral cutting edge as described above, the third cutting edge 47 may mainly contribute to the cutting process. The third cutting edge 47 may therefore be called the main cutting edge 9 in some cases. The second corner cutting edge 51 may be located at the fourth corner 41. The second corner cutting edge 51 may be located over the whole of the fourth corner 41 as illustrated in FIG. 2.

Figure 6:
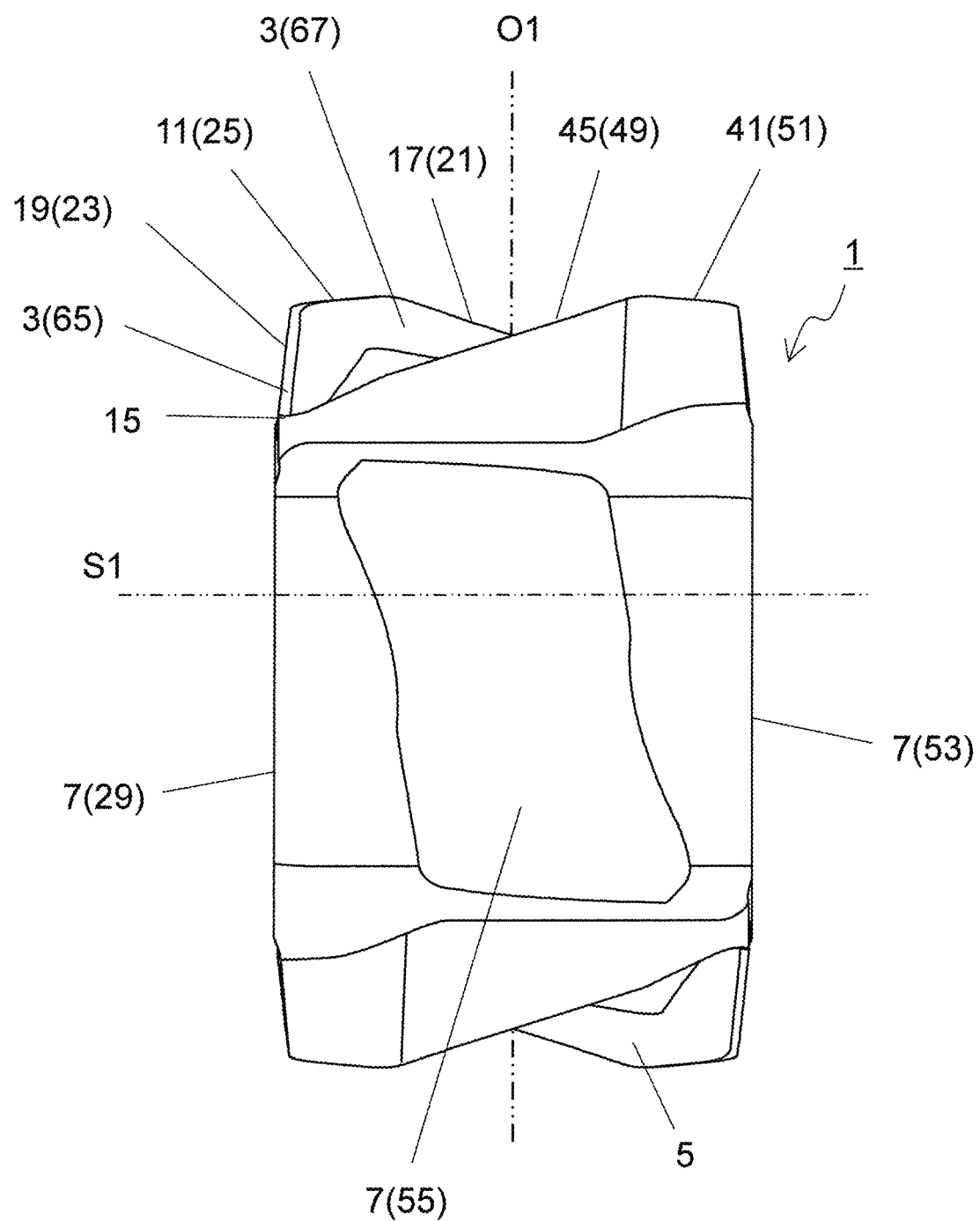
FIG. 6 is a side view of the insert illustrated in FIG. 2 as viewed from A3 direction.
Figure 7:
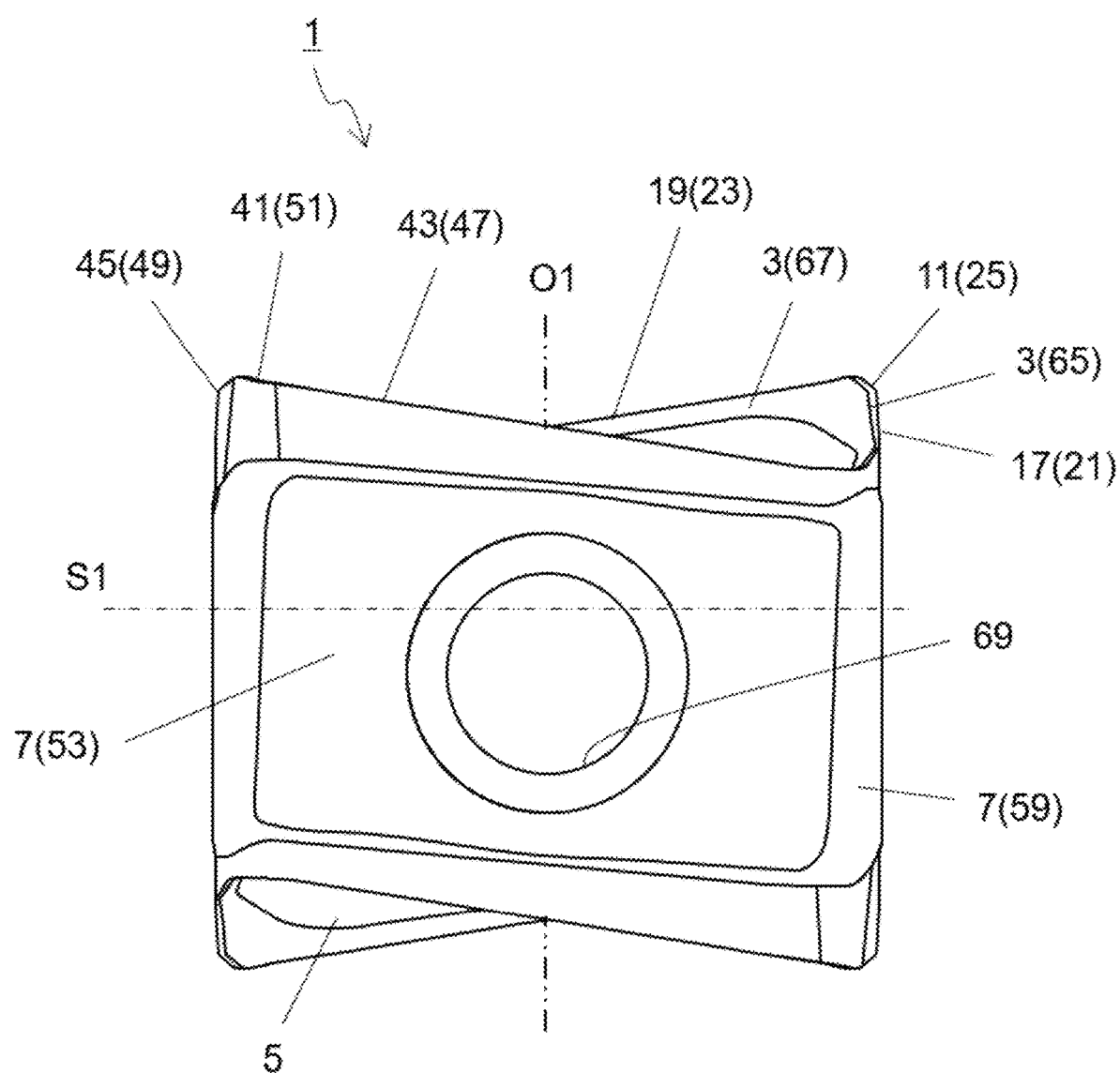
FIG. 7 is a side view of the insert illustrated in FIG. 2 as viewed from A4 direction.
Figure 8:
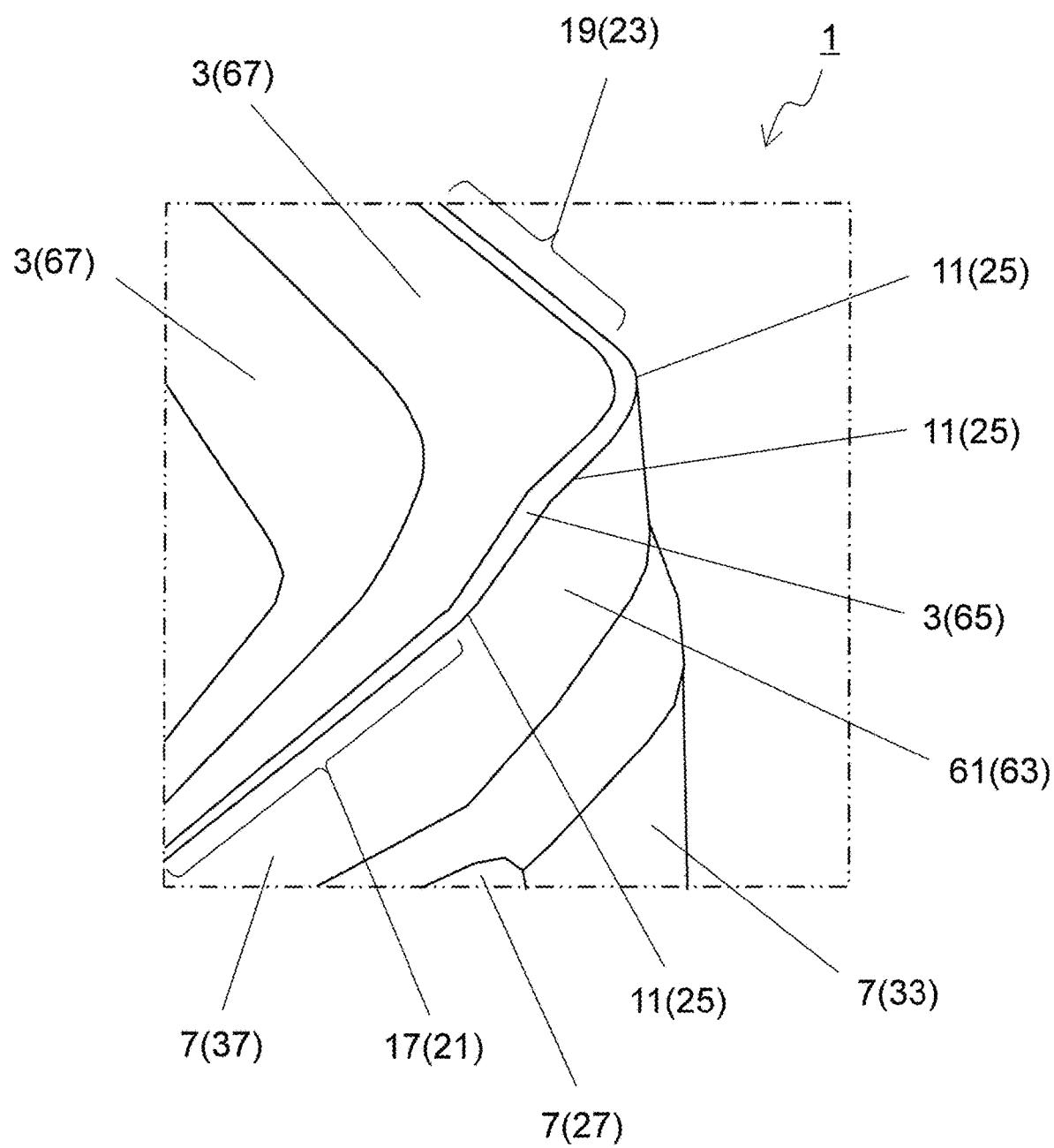
FIG. 8 is an enlarged view of a region B1 illustrated in FIG. 1.

The lateral surface 7 may further include a third lateral surface 53 and a fourth lateral surface 55 as illustrated in FIGS. 6 and 7. At least a part of the third lateral surface 53 may be located between the third side 43 and the second surface 5. The third lateral surface 53 may have a planar shape. At least a part of the fourth lateral surface 55 may be located between the fourth side 45 and the second surface 5. The fourth lateral surface 55 may have a planar shape.

The third lateral surface 53 and the fourth lateral surface 55 may be used as a surface brought into contact with the holder if fixing the insert 1 to the holder. The insert 1 may be stably fixable to the holder because the third lateral surface 53 and the fourth lateral surface 55 are flat.

For example, if the first cutting edge 21, the second cutting edge 23 and the first corner cutting edge 25 may be used in the cutting process of the workpiece, the third lateral surface 53 and the fourth lateral surface 55 may be brought into contact with the holder. If the third cutting edge 47, the fourth cutting edge 49 and the second corner cutting edge 51 are used in the cutting process of the workpiece, the first lateral surface 27 and the second lateral surface 29 may be brought into contact with the holder.

The fourth lateral surface 55 may be located further outside than the fourth side 45 in the front view of the first surface 3. In other words, the fourth lateral surface 55 may be located further away from the center of the first surface 3 than the fourth side 45 in the front view of the first surface 3. If the fourth lateral surface 55 is located further outside than the fourth side 45, the cutting edge 9 may be less likely to come into contact with the holder if the fourth lateral surface 55 is brought into contact with the holder in order to fix the insert 1 to the holder. The holder and the cutting edge 9 may therefore be less susceptible to damage.

The first lateral surface 27 may include a region located further away from the third lateral surface 53 as coming closer to the second surface 5. Hereinafter, this region may be referred to as a third region 57. The third region 57 may be located so as to include an end portion of the first lateral surface 27 which is located on a side of the third lateral surface 53 as illustrated in FIG. 4.

At least a part of an outer peripheral edge of the first lateral surface 27 which is located on a side of the third lateral surface 53 may be included in the third region 57. The part of the outer peripheral edge of the first lateral surface 27 which is included in the third region 57 may be located further away from the third lateral surface 53 as coming closer to the second surface 5.

As illustrated in FIG. 1, a second curved surface 59 having a convex curved surface shape may be located between the first lateral surface 27 and the third lateral surface 53. The second curved surface 59 may be located between the second corner 13 and the second surface 5 as in the non-limiting embodiment illustrated in FIG. 1. A boundary part C3 between the first lateral surface 27 and the second curved surface 59 may be located further away from the third lateral surface 53 as coming closer to the second surface 5 as in the non-limiting embodiment illustrated in FIG. 4. Specifically, the boundary part C3 may be extended obliquely in a direction from upper left to lower right as in the non-limiting embodiment illustrated in FIG. 4.

The part of the first lateral surface 27 which is included in the third region 57 may be located further away from the third lateral surface 53 as coming closer to the second surface 5. In other words, the part of the outer peripheral edge of the first lateral surface 27 which is included in the third region 57 may be located closer to the third lateral surface 53 as coming closer to the first surface 3.

The insert 1 may tend to be stably restricted by the holder even if a large thrust force (force in a direction from the fourth corner 41 toward the second corner 13) is applied to the second corner cutting edge 51 in the cutting process of the workpiece by using the second corner cutting edge 51.

The lateral surface 7 may further include a third connection surface 61. The third connection surface 61 may be located in a region in the lateral surface 7 which is located along the first corner 11, and may connect to the first corner 11 as illustrated in FIG. 1. The third connection surface 61 may be located between the first corner 11 and the first curved surface 33 in the non-limiting embodiment illustrated in FIG. 1.

Figure 12:
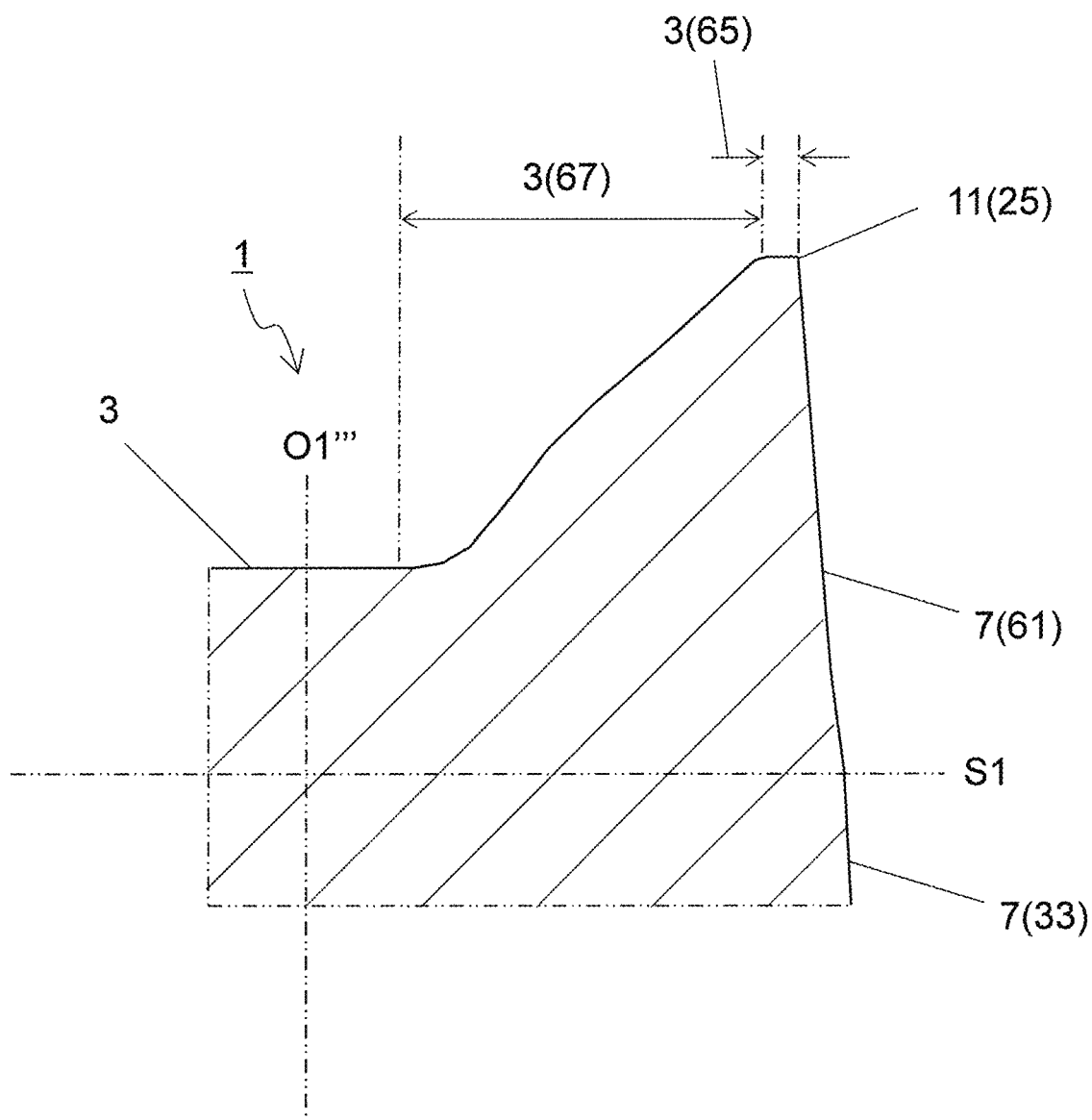
FIG. 12 is a sectional view taken along line XII-XII in the insert illustrated in FIG. 9.

The third connection surface 61 may be inclined or parallel to the central axis O1 in the cross section including the central axis O1. FIG. 12 may correspond to the cross section including the central axis O1 and may illustrate a third imaginary straight line O1''' parallel to the central axis O1. For example, the third connection surface 61 may be inclined so as to be located away from the central axis O1 (the third imaginary straight line O1''') as going away from the first corner 11 in the above cross section.

If the third connection surface 61 is inclined as described above, a blade tip of the first corner cutting edge 25 may have a large thickness and enhanced strength. The insert 1 may have enhanced durability because of the enhanced strength of the first corner cutting edge 25 that is susceptible to a relatively large cutting load.

In cases where the lateral surface 7 includes the third connection surface 61, the third connection surface 61 may include a fourth region 63. The fourth region 63 may have a larger inclination angle relative to the central axis O1 as going away from the first side 17. If the third connection surface 61 includes the fourth region 63, strength of the second cutting edge 23 can be enhanced while sharpening the blade tip of the first cutting edge 21.

Figure 9:
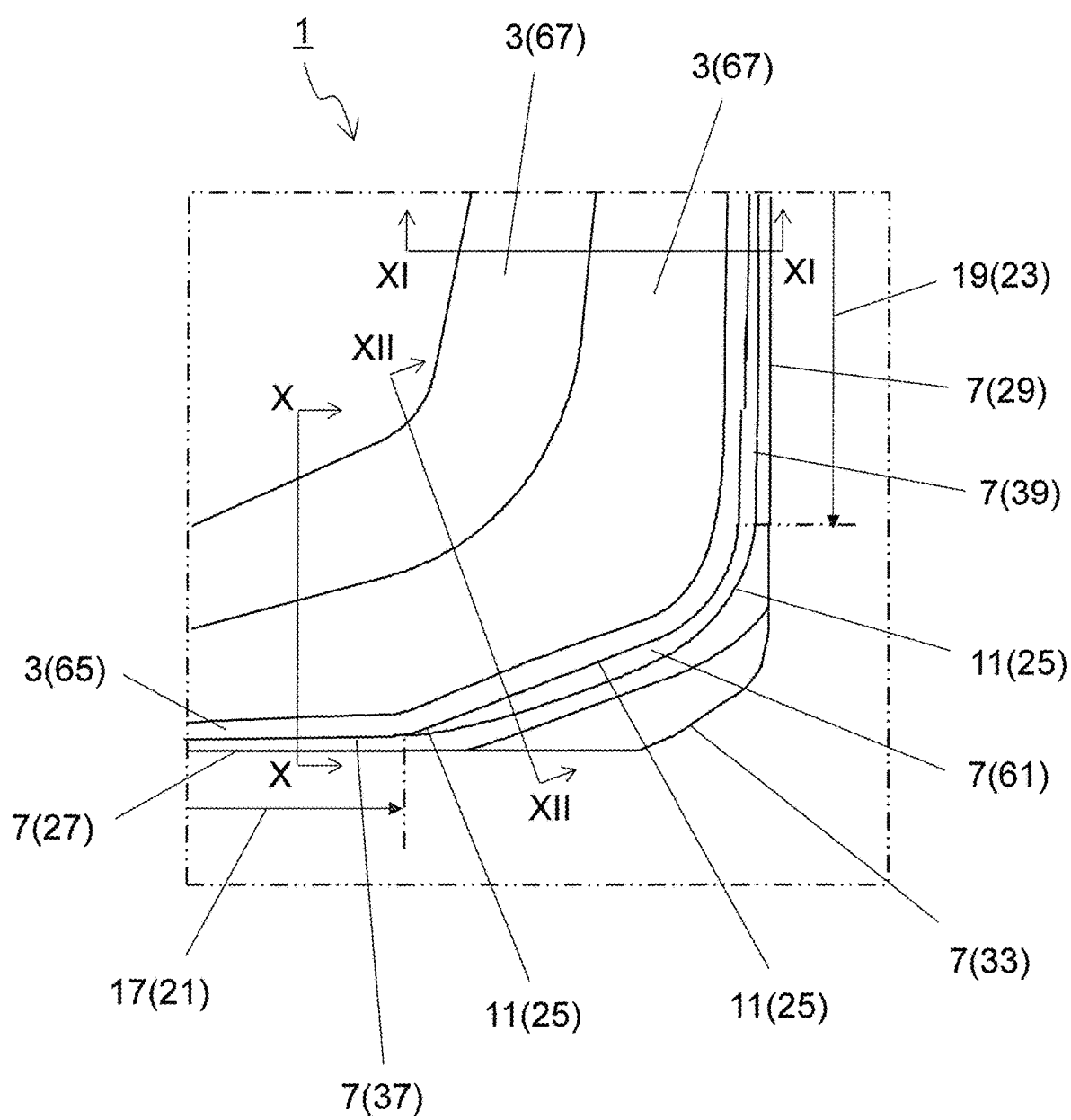
FIG. 9 is an enlarged view of a region B2 illustrated in FIG. 2.

The first surface 3 may include a land surface 65 and an inclined surface 67 as in the non-limiting embodiment illustrated in FIG. 2. The land surface 65 may be located along the first side 17, the second side 19 and the first corner 11. This may be rephrased that the land surface 65 is located along the first cutting edge 21, the second cutting edge 23 and the first corner cutting edge 25 in a non-limiting embodiment illustrated in FIG. 9. The cutting edge 9 may have enhanced durability if the first surface 3 includes the land surface 65.

The inclined surface 67 may be located along the land surface 65. The inclined surface 67 may be located further inside the first surface 3 than the land surface 65 in the non-limiting embodiment illustrated in FIG. 2. The inclined surface 67 may be located closer to the reference plane S1 as going away from the land surface 65. The inclined surface 67 in the first surface 3 may be the rake surface region as described above.

If the first surface 3 includes the inclined surface 67 that is servable as a rake surface, it may be easy to control a flow direction of chips generated by the cutting edge 9 during the cutting process, thus leading to enhanced chip discharge performance. An inclination angle of the inclined surface 67 may be larger than an inclination angle of the land surface 65. As used herein, the term "inclination angle of each of the land surface 65 and the inclined surface 67" may denote an angle relative to the reference plane S1.

The insert 1 may include a through hole 69 that opens into regions located on opposite sides of the lateral surface 7, specifically the second lateral surface 29 and the third lateral surface 53 as in the non-limiting embodiment illustrated in FIGS. 5 and 7. A central axis O1 of the through hole 69 may be inclined or orthogonal to the central axis O1 of the insert 1.

The through hole 69 may be usable to insert, for example, a screw if fixing the insert 1 to the holder. Instead of the screw, for example, a clamping member may be used to fix the insert 1 to the holder.

Although the through hole 69 opens into the regions located on the opposite sides of the lateral surface 7 in the non-limiting embodiment illustrated in FIG. 1, it is not intended to limit the through hole 69 to the above configuration. For example, the through hole 69 may be formed from the center of the first surface 3 toward the center of the second surface 5.

For example, cemented carbide and cermet may be usable as a material of the insert 1. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, it is not intended to limit the material of the insert 1 to the above composition.

A surface of the insert 1 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Cutting Tools>

Figure 13:
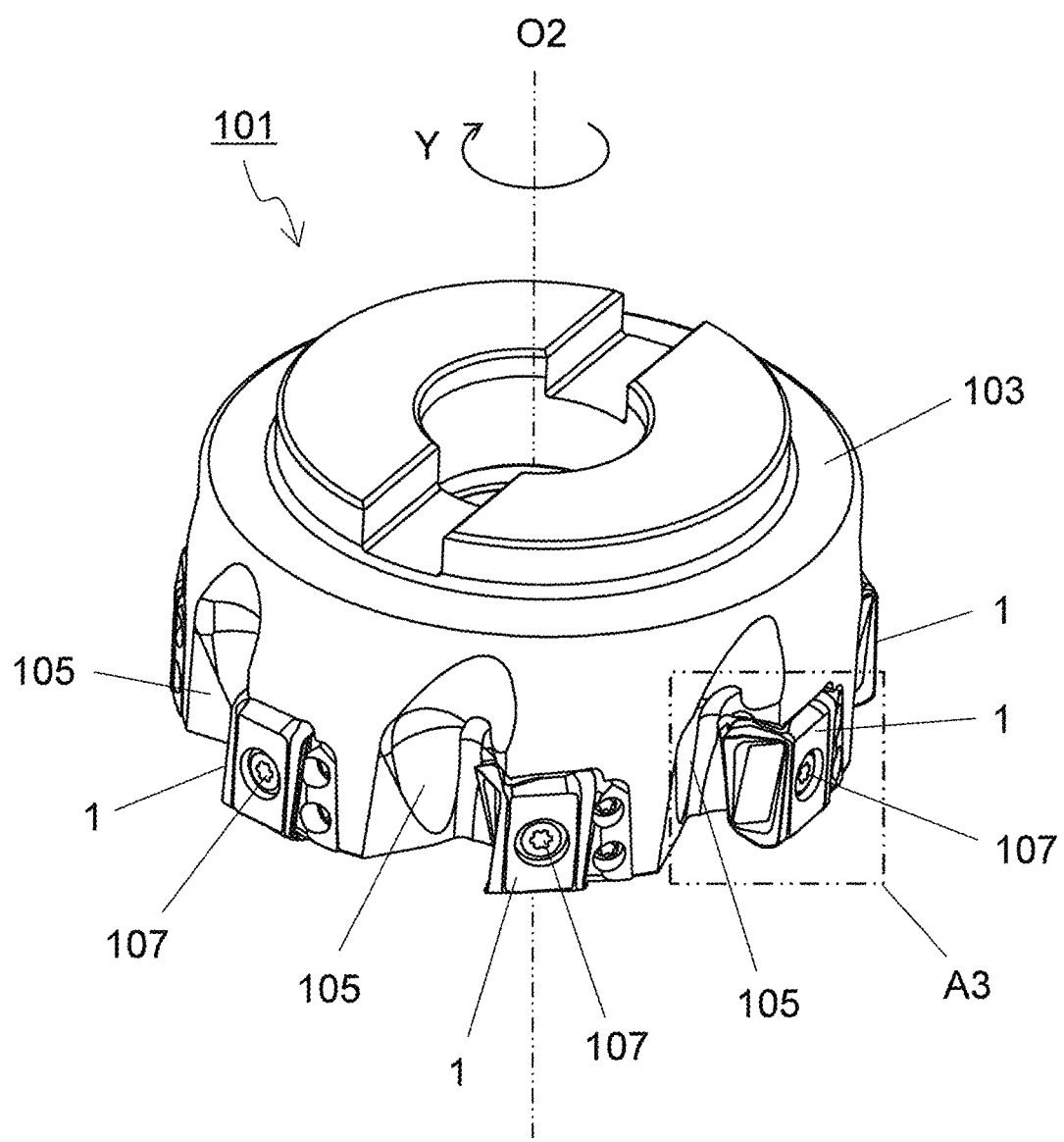
FIG. 13 is a perspective view illustrating a cutting tool in a non-limiting aspect of the present disclosure.
Figure 14:
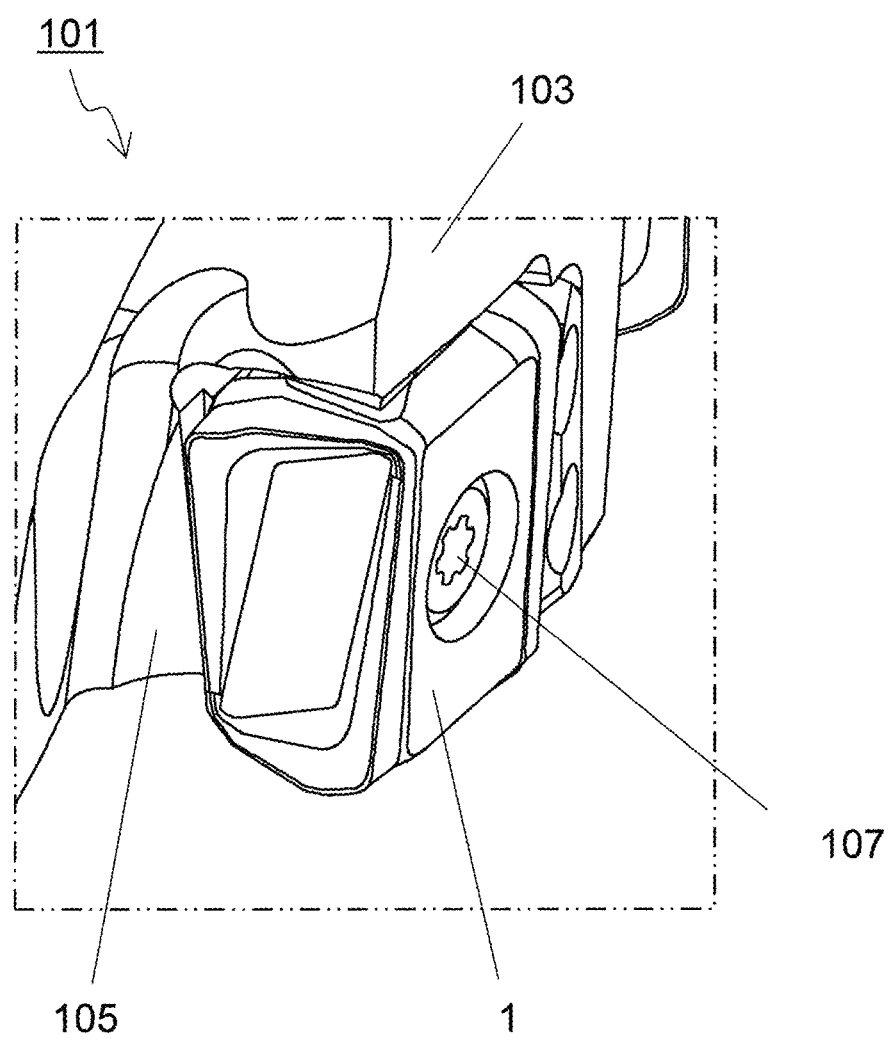
FIG. 14 is an enlarged view of a region B3 illustrated in FIG. 13.

A cutting tool 101 in a non-limiting embodiment is described below with reference to FIGS. 13 and 14. FIGS. 13 and 14 may illustrate a state where the insert illustrated in FIG. 1 is attached to a pocket 105 of a holder 103 by a screw 107. A rotation axis O2 of the cutting tool 101 may be indicated by a two-dot chain line in FIG. 13 or the like.

The cutting tool 101 in the present embodiment may be used for a milling process. The cutting tool 101 may include the holder 103 and the insert as illustrated in FIG. 13. The holder 103 may have a columnar shape extended from a first end to a second end along a rotation axis O2. The holder 103 may include a pocket 105 located on a side of the first end. The insert may be located in the pocket 105.

The holder 103 may include only one pocket 105, or alternatively, a plurality of pockets 105 as in a non-limiting embodiment illustrated in FIG. 13. If the holder 103 includes the pockets 105, the cutting tool 101 may include a plurality of inserts, and the inserts may be located one by one in the pockets 105.

The pocket 105 may open into an outer peripheral surface of the holder 103 and an end surface on a side of the first end. In cases where the holder 103 includes the pockets 105, these pockets 105 may be located at equal intervals or unequal intervals around the rotation axis O2. As apparent from, for example, the fact that the holder 103 includes the pockets 105, the holder 103 may not be a strict columnar shape.

The insert 1 may be attached to the pocket 105 so that at least a part of the cutting edge is protruded from the holder 103. Specifically, the insert 1 of the present embodiment may be attached to the holder 103 so that the second cutting edge is located more outside than the outer peripheral surface in the holder, and the first cutting edge is protruded from the holder 103 toward a workpiece.

At least a flat surface region in the second surface and the lateral surface in the insert may be in contact with the holder 103 in the cutting tool 101 of the present embodiment.

The insert may be attached to the pocket 105 by a screw 107 in the present embodiment. Specifically, the insert may be attached to the holder 103 by inserting the screw 107 into a screw hole of the insert, and by inserting a front end of the screw 107 into a screw hole formed in the pocket 105 so as to fix the screw 107 to the screw hole.

For example, steel or cast iron may be used as a material of the holder 103. Of these materials, the use of steel may particularly contribute to enhancing toughness of the holder 103.

<Method for Manufacturing Machined Product>

Figure 15:
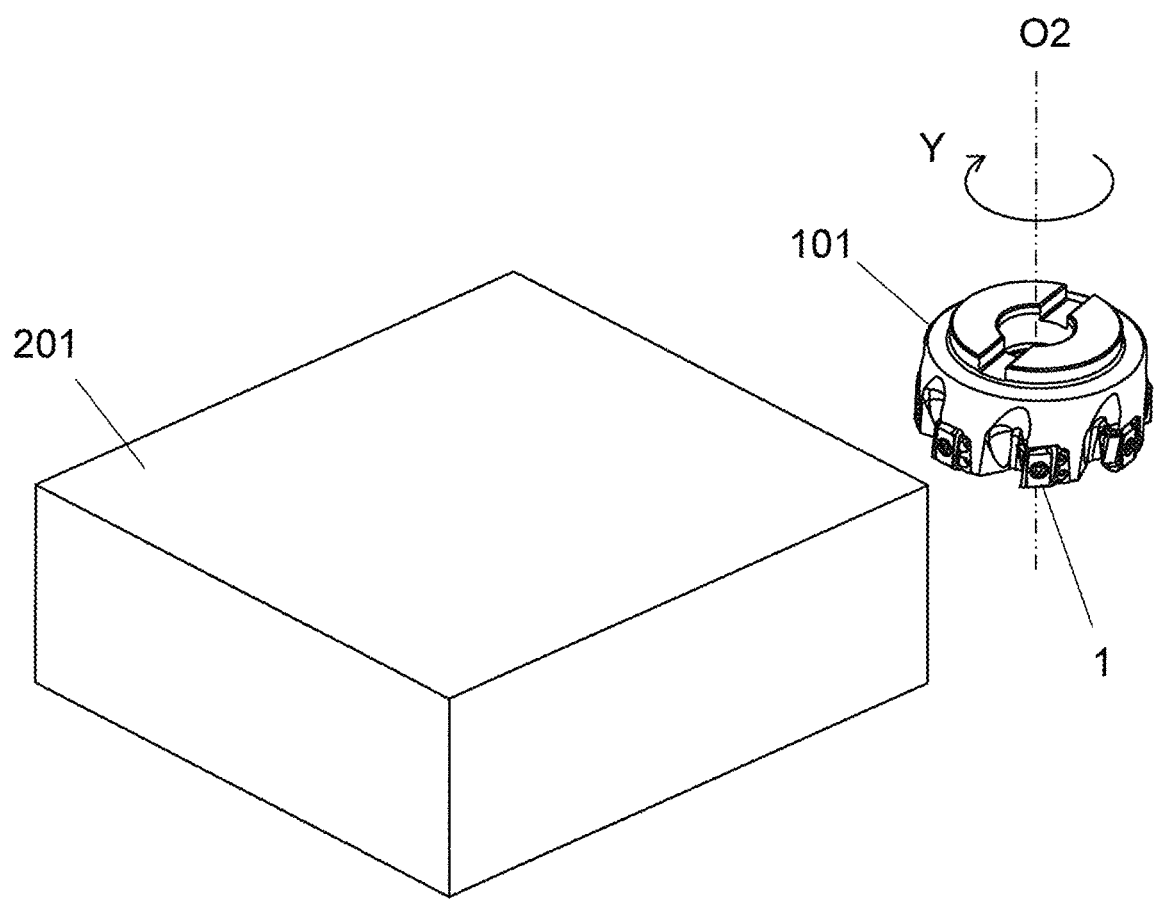
FIG. 15 is a schematic diagram illustrating one of steps in a method for manufacturing a machined product in a non-limiting aspect of the present disclosure.
Figure 16:
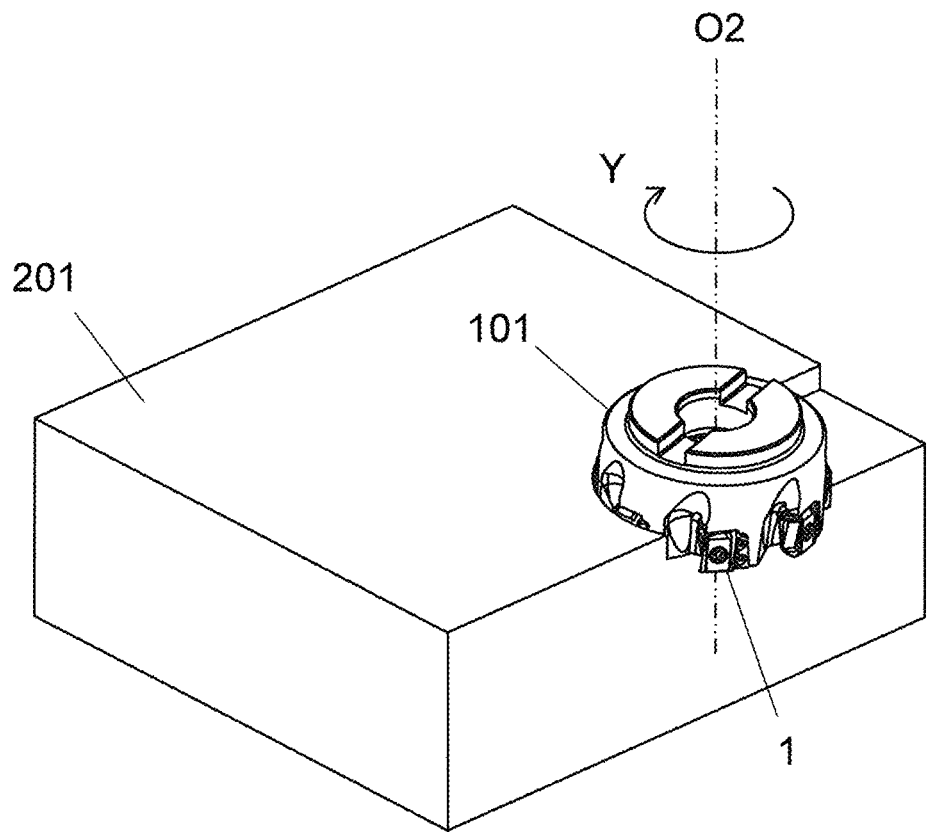
FIG. 16 is a schematic diagram illustrating one of the steps in the method for manufacturing a machined product in the non-limiting aspect of the present disclosure.
Figure 17:
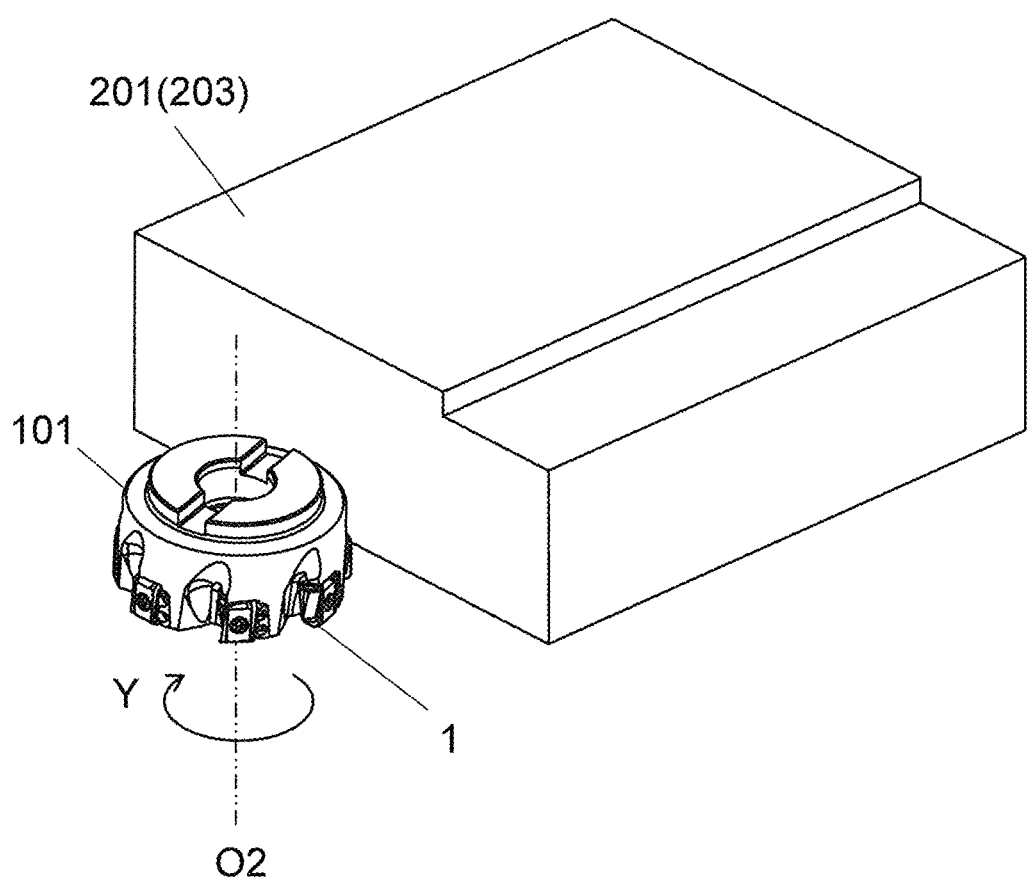
FIG. 17 is a schematic diagram illustrating one of the steps in the method for manufacturing a machined product in the non-limiting aspect of the present disclosure.

A method for manufacturing a machined product in a non-limiting aspect of the present disclosure may be described below with reference to FIGS. 15 to 17. FIGS. 15 to 17 may illustrate a method for manufacturing a machined product in a cutting process using the above cutting tool. The rotation axis O2 of the cutting tool 101 may be indicated by a two-dot chain line in FIGS. 15 to 17. The machined product 203 may be manufacturable by carrying out the cutting process of the workpiece 201.

The method for manufacturing the machined product may include the following steps:

(1) rotating the cutting tool 101 represented by the foregoing non-limiting embodiment;

(2) bringing the cutting tool 101 being rotated into contact with the workpiece 201; and (3) moving the cutting tool 101 away from the workpiece 201.

Specifically, firstly, the cutting tool 101 may be relatively brought near the workpiece 201 while rotating the cutting tool 101 in Y direction around the rotation axis O2 as illustrated in FIG. 15. The workpiece 201 may be then cut out by bringing the cutting edge of the cutting tool 101 into contact with the workpiece 201 as illustrated in FIG. 16. Thereafter, the cutting tool 101 may be relatively moved away from the workpiece 201 as illustrated in FIG. 17.

The workpiece 201 may be fixed and the cutting tool 101 may be brought near the workpiece 201. The workpiece 201 may be fixed and the cutting tool 101 may be rotated around the rotation axis O2 as in a non-limiting embodiment illustrated in FIGS. 15 to 17. The workpiece 201 may be fixed and the cutting tool 101 may be moved away as in the non-limiting embodiment illustrated in FIG. 17.

In the non-limiting embodiment illustrated in FIGS. 15 to 17, the workpiece 201 may be fixed and the cutting tool 101 may be moved in each of the steps. However, it is not intended to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing the cutting edge of the insert into contact with different portions of the workpiece 201 may be repeated while keeping the cutting tool 101 rotated.

Representative examples of material of the workpiece 201 may include carbon steel, alloy steel, stainless steel, cast iron and nonferrous metals.

The invention claimed is:

1. A cutting insert, comprising:
a first surface having a polygonal shape;
a second surface located on a side opposite to the first surface; and
a lateral surface located between the first surface and the second surface, wherein
along an outer peripheral edge of the first surface, the polygonal shape of the first surface comprises
a first corner,
a second corner located adjacent to the first corner,
a third corner located adjacent to the first corner,
a first side edge directly connecting to each of the first corner and the second corner, and
a second side edge directly connecting to each of the first corner and the third corner,
the first side edge is shorter than the second side edge,
the first side edge and the second side edge are configured to perform a cutting process of a workpiece,
the lateral surface comprises
a first lateral surface an entirety of which is flat and at least a part of which is located between the first side edge and the second surface,
a second lateral surface which is flat and at least a part of which is located between the second side edge and the second surface,
a first curved surface which is located between the first surface and the second surface,
a first connection surface extending from the first side edge, and
a transition surface extending from the first connection surface to the first lateral surface, the transition surface inclined outwardly with respect to the first connection surface in a front view of the first surface,
the entirety of the first lateral surface is located further outside than the first side edge and the first connection surface in the front view of the first surface,
the first lateral surface comprises a first region having a boundary located closer to the second lateral surface as the first region comes closer to the second surface,
the first region contacts the first curved surface,
an imaginary straight line passing through a center of the first surface and a center of the second surface is a central axis, a secondary central axis perpendicular to the central axis passes through a center of the first lateral surface, and the first lateral surface has 180-degree rotational symmetry about the secondary central axis,
the second lateral surface is located further outside than the second side edge in the front view of the first surface,
the second lateral surface comprises a second region located closer to the first lateral surface as the second region comes closer to the second surface,
the second region contacts the first curved surface,
a boundary between the first curved surface and the second region comprises an end portion closest to the first lateral surface compared with a remainder of the boundary,
the end portion is closer to the second surface than the first surface,
each of the first lateral surface and the second lateral surface is spaced apart from the first side edge and the second side edge, and
the first lateral surface and the second lateral surface are configured to contact a holder when fixing the cutting insert to the holder.

2. The cutting insert according to claim 1, wherein
at least a part of the first region is located between the first corner and the second surface in a front view of the first lateral surface.

3. The cutting insert according to claim 1, wherein
the first lateral surface is parallel to the central axis in a cross section including the central axis.

4. The cutting insert according to claim 1, wherein
at least a part of the second region is located between the first corner and the second surface in a front view of the second lateral surface.

5. The cutting insert according to claim 1, wherein
the second lateral surface is parallel to the central axis in a cross section including the central axis.

6. The cutting insert according to claim 1, wherein
a width of the first lateral surface in a direction parallel to the central axis is a first width,
a width of the second lateral surface in the direction parallel to the central axis is a second width, and
the second width is larger than the first width.

7. The cutting insert according to claim 1, wherein
the first connection surface is parallel to the central axis in a cross section including the central axis.

8. The cutting insert according to claim 7, wherein
a width of the first connection surface in a direction parallel to the central axis becomes larger as the first connection surface comes closer to the first corner in a front view of the first lateral surface.

9. The cutting insert according to claim 1, wherein
the lateral surface further comprises a second connection surface connecting to the second side edge, and the second connection surface comprises a part inclined so as to be located away from the central axis as the part goes away from the second side edge in a cross section including the central axis.

10. The cutting insert according to claim 9, wherein a width of the second connection surface in a direction parallel to the central axis becomes larger as the second connection surface comes closer to the first corner in a front view of the second lateral surface.

11. The cutting insert according to claim 1, wherein along the outer peripheral edge of the first surface, the polygonal shape of the first surface further comprises
a fourth corner located adjacent to the second corner, and
a third side edge located between the second corner and the fourth corner,
the lateral surface further comprises a third lateral surface at least a part of which is located between the third side edge and the second surface, and
the first lateral surface comprises a third region located away from the third lateral surface as the third region comes closer to the second surface.

12. The cutting insert according to claim 1, wherein the lateral surface further comprises a corner connection surface connecting to the first corner, and
the corner connection surface is inclined so as to be located away from the central axis as the corner connection surface goes away from the first corner in a cross section including the central axis.

13. The cutting insert according to claim 12, wherein the corner connection surface comprises a region whose inclination angle relative to the central axis becomes larger as the region goes away from the first side edge.

14. The cutting insert according to claim 1, wherein an entirety of the first connection surface is located closer to the first side edge than the first lateral surface in the front view of the first surface.

15. A cutting tool, comprising:
the cutting insert according to claim 1; and
the holder which has a columnar shape extended from a first end to a second end along a rotation axis, and which comprises a pocket located on a side of the first end, wherein
the cutting insert is located in the pocket.

16. A method for manufacturing a machined product, comprising:
rotating the cutting tool according to claim 15;
bringing the cutting tool being rotated into contact with a workpiece; and
moving the cutting tool away from the workpiece.

17. A cutting insert, comprising:
a first surface having a polygonal shape;
a second surface located on a side opposite to the first surface; and
a lateral surface located between the first surface and the second surface, wherein
along an outer peripheral edge of the first surface, the polygonal shape of the first surface comprises
a first corner,
a second corner located adjacent to the first corner,
a third corner located adjacent to the first corner,
a first side edge directly connecting to each of the first corner and the second corner, and
a second side edge directly connecting to each of the first corner and the third corner,
the first side edge is shorter than the second side edge,
the first side edge and the second side edge are configured to perform a cutting process of a workpiece,
the lateral surface comprises
a first lateral surface an entirety of which is flat and at least a part of which is located between the first side edge and the second surface,
a second lateral surface which is flat and at least a part of which is located between the second side edge and the second surface,
a first connection surface extending from the first side edge, and
a transition surface extending from the first connection surface to the first lateral surface, the transition surface inclined outwardly with respect to the first connection surface in a front view of the first surface,
the entirety of the first lateral surface is located further outside than the first side edge and the first connection surface in the front view of the first surface,
the first lateral surface comprises a first region having a boundary located closer to the second lateral surface as the first region comes closer to the second surface,
an imaginary straight line passing through a center of the first surface and a center of the second surface is a central axis, a secondary central axis perpendicular to the central axis passes through a center of the first lateral surface, and the first lateral surface has 180-degree rotational symmetry about the secondary central axis,
the first connection surface is parallel to the central axis in a cross section including the central axis,
each of the first lateral surface and the second lateral surface is spaced apart from the first side edge and the second side edge, and
the first lateral surface and the second lateral surface are configured to contact a holder when fixing the cutting insert to the holder.

18. The cutting insert according to claim 17, wherein a width of the first connection surface in a direction parallel to the central axis becomes larger as the first connection surface comes closer to the first corner in a front view of the first lateral surface.

19. A cutting tool, comprising:
the cutting insert according to claim 17; and
the holder which has a columnar shape extended from a first end to a second end along a rotation axis, and which comprises a pocket located on a side of the first end, wherein
the cutting insert is located in the pocket.

20. A method for manufacturing a machined product, comprising:
rotating the cutting tool according to claim 19;
bringing the cutting tool being rotated into contact with a workpiece; and
moving the cutting tool away from the workpiece.

* * * * *